United States Patent
Shahbazi Mirzahasanloo et al.

(10) Patent No.: US 10,573,331 B2
(45) Date of Patent: Feb. 25, 2020

(54) COOPERATIVE PYRAMID VECTOR QUANTIZERS FOR SCALABLE AUDIO CODING

(71) Applicant: QUALCOMM Incorporated, San Diego, CA (US)

(72) Inventors: Taher Shahbazi Mirzahasanloo, San Diego, CA (US); Rogerio Guedes Alves, Macomb Township, MI (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/050,844

(22) Filed: Jul. 31, 2018

(65) Prior Publication Data
US 2019/0341064 A1 Nov. 7, 2019

Related U.S. Application Data

(60) Provisional application No. 62/665,138, filed on May 1, 2018.

(51) Int. Cl.
*G10L 19/00* (2013.01)
*G10L 19/035* (2013.01)
(Continued)

(52) U.S. Cl.
CPC ........ *G10L 19/035* (2013.01); *G10L 19/0017* (2013.01); *G10L 19/038* (2013.01); *G10L 25/18* (2013.01); *H04W 4/80* (2018.02)

(58) Field of Classification Search
CPC ... G10L 19/00; G10L 19/0017; G10L 19/002; G10L 19/035; G10L 19/038; G10L 25/18;
(Continued)

(56) References Cited

U.S. PATENT DOCUMENTS 5,594,833 A 1/1997 Miyazawa et al.
6,263,312 B1 * 7/2001 Kolesnik ............. G10L 19/0208
704/229

(Continued)

FOREIGN PATENT DOCUMENTS

CN 101145787 A 3/2008
WO 2015162500 A2 10/2015

OTHER PUBLICATIONS

"Bluetooth Core Specification v 5.0," published Dec. 6, 2016 accessed from https://www.bluetooth.com/specifications, 5 pp.
(Continued)

*Primary Examiner* — Gerald Gauthier
(74) *Attorney, Agent, or Firm* — Shumaker & Sieffert, P.A.

(57) ABSTRACT

An example apparatus includes a memory configured to store the audio data; and one or more processors in communication with the memory, the one or more processors configured to: obtain, for each of a plurality of subbands of audio data, a respective energy scalar and a respective residual identifier; determine overall distortion levels for a plurality of candidate subband pulse allocations for performing pyramid vector dequantization (PVdQ) of the residual identifiers; select, from the plurality of subband pulse allocations and based on the overall distortion levels, a candidate subband pulse allocation; and perform, using the candidate subband pulse allocation, PVdQ on the residual identifiers to reconstruct a residual vector for each subband.

30 Claims, 15 Drawing Sheets

(51) Int. Cl.
*G10L 19/038* (2013.01)
*H04W 4/80* (2018.01)
*G10L 25/18* (2013.01)

(58) Field of Classification Search
CPC ........ G10L 19/083; G10L 19/16; H04W 4/80; G06F 3/16; H04S 7/00
USPC ....... 375/240.03, 299; 704/5, 208, 223, 230, 704/503, 219, 222, 225, 500; 381/23
See application file for complete search history.

(56) References Cited

U.S. PATENT DOCUMENTS

| | | | |
|---|---|---|---|
| 6,567,781 B1* | 5/2003 | Lafe | G10L 19/0212 704/500 |
| 6,574,593 B1 | 6/2003 | Gao et al. | |
| 6,725,192 B1* | 4/2004 | Araki | G10L 19/0208 704/200.1 |
| 6,735,339 B1 | 5/2004 | Ubale | |
| 7,617,096 B2* | 11/2009 | Thyssen | G10L 19/07 704/219 |
| 7,689,427 B2 | 3/2010 | Vasilache | |
| 7,702,514 B2 | 4/2010 | Lin et al. | |
| 8,396,163 B2* | 3/2013 | Collings | H04B 7/0639 375/299 |
| 8,620,673 B2* | 12/2013 | Zhang | G10L 19/008 704/500 |
| 8,694,325 B2 | 4/2014 | Lin et al. | |
| 9,015,052 B2 | 4/2015 | Lin et al. | |
| 9,263,050 B2 | 2/2016 | Daniel et al. | |
| 9,546,924 B2 | 1/2017 | Grancharov et al. | |
| 9,754,594 B2 | 9/2017 | Liu et al. | |
| 2001/0049598 A1* | 12/2001 | Das | G10L 19/08 704/208 |
| 2004/0002859 A1 | 1/2004 | Liu et al. | |
| 2005/0165611 A1* | 7/2005 | Mehrotra | G10L 19/035 704/500 |
| 2007/0016414 A1* | 1/2007 | Mehrotra | G10L 19/038 704/230 |
| 2007/0094019 A1* | 4/2007 | Nurminen | H03M 7/40 704/222 |
| 2009/0006103 A1* | 1/2009 | Koishida | G10L 19/167 704/500 |
| 2010/0174531 A1 | 7/2010 | Bernard Vos | |
| 2011/0178807 A1* | 7/2011 | Yang | G10L 19/093 704/500 |
| 2012/0226505 A1* | 9/2012 | Lin | G10L 19/002 704/500 |
| 2012/0232913 A1* | 9/2012 | Terriberry | G10L 19/038 704/503 |
| 2012/0259644 A1* | 10/2012 | Lin | G10L 19/038 704/500 |
| 2012/0296658 A1 | 11/2012 | Smyth | |
| 2012/0323582 A1* | 12/2012 | Peng | G10L 19/24 704/500 |
| 2013/0080157 A1* | 3/2013 | Kim | G10L 19/0208 704/225 |
| 2013/0275140 A1* | 10/2013 | Kim | G10L 19/002 704/500 |
| 2013/0332177 A1* | 12/2013 | Helmrich | G10L 19/012 704/500 |
| 2014/0156284 A1* | 6/2014 | Porov | G10L 19/0017 704/500 |
| 2015/0073784 A1* | 3/2015 | Gao | G10L 19/0204 704/223 |
| 2016/0027449 A1* | 1/2016 | Svedberg | G10L 19/038 704/230 |
| 2016/0088297 A1* | 3/2016 | Svedberg | G10L 19/00 375/240.03 |
| 2016/0142845 A1* | 5/2016 | Dick | G10L 19/008 381/23 |
| 2016/0232908 A1* | 8/2016 | Fuchs | G10L 19/08 |
| 2016/0254004 A1* | 9/2016 | Norvell | G10L 25/51 704/500 |
| 2016/0275955 A1 | 9/2016 | Liu et al. | |
| 2017/0069328 A1* | 3/2017 | Kawashima | G10L 19/0204 |
| 2017/0148460 A1* | 5/2017 | Atti | G10L 19/06 |
| 2017/0215019 A1* | 7/2017 | Chen | G10L 21/0308 |
| 2017/0223356 A1 | 8/2017 | Sung et al. | |
| 2017/0301359 A1* | 10/2017 | Svedberg | G10L 19/038 |
| 2018/0060023 A1* | 3/2018 | Nemer | G06F 3/165 |
| 2018/0061428 A1* | 3/2018 | Seroussi | G10L 19/002 |
| 2018/0182400 A1* | 6/2018 | Choo | G10L 19/02 |

OTHER PUBLICATIONS

"Advanced Audio Distribution Profile Specification," version 1.3.1, published Jul. 14, 2015, 35 pp.

Hung, et al., "Error-resilient pyramid vector quantization for image compression," IEEE Transactions on Image Processing, vol. 7, No. 10, Oct. 1998, pp. 1373-1386.

Chou, et al., "Vertex Data Compression through Vector Quantization," IEEE Transactions on Visualization and Computer Graphics, vol. 8, No. 4, Oct.-Dec. 2002, pp, 373-382.

"MDCT Audio Coding with Pulse Vector Quantizers," accessed from https://www.ericsson.com/assets/local/publications/conference-papers/mdct_audio_coding_with_pulse_vector_quantizers.pdf, 5 pp.

"Chapter 13: Policy Gradient Methods," Reinforcement Learning: An Introduction, second edition,pp. 323-340.

Fischer, "A pyramid vector quantizer," IEEE Transactions on Information Theory, vol. 32 No. 4, Jul. 1986, pp. 568-583.

Hong, "Unsupervised Feature Selection Using Clustering Ensembles and Population Based Incremental Learning Algorithm," Dec. 20, 2007, 32 pp.

Bishop, "Pattern Recognition and Machine Learning" Information Science and Statistics, published Apr. 2011, 758 pp.

U.S. Appl. No. 16/050,894, filed by Taher Shahbazi Mirzahasanloo et al., [Qualcomm, Inc.], filed Jul. 31, 2018.

U.S. Appl. No. 16/050,966, filed by Taher Shahbazi Mirzahasanloo et al., [Qualcomm, Inc.], filed Jul. 31, 2018.

U.S. Appl. No. 16/051,007, filed by Taher Shahbazi Mirzahasanloo et al., [Qualcomm, Inc.], filed Jul. 31, 2018.

* cited by examiner

COOPERATIVE PYRAMID VECTOR QUANTIZERS FOR SCALABLE AUDIO CODING

This application claims the benefit of U.S. Provisional Application No. 62/665,138, filed May 1, 2018, the entire content of which is incorporated by reference herein.

TECHNICAL FIELD

This disclosure relates to audio encoding and decoding.

BACKGROUND

Wireless networks for short-range communication, which may be referred to as "personal area networks," are established to facilitate communication between a source device and a sink device. One example of a personal area network (PAN) protocol is Bluetooth®, which is often used to form a PAN for streaming audio data from the source device (e.g., a mobile phone) to the sink device (e.g., headphones or a speaker).

In some examples, the Bluetooth® protocol is used for streaming encoded or otherwise compressed audio data. In some examples, audio data is encoded using gain-shape vector quantization audio encoding techniques. In gain-shape vector quantization audio encoding, audio data is transformed into the frequency domain and then separated into subbands of transform coefficients. A scalar energy level (e.g., gain) of each subband is encoded separately from the shape (e.g., a residual vector of transform coefficients) of the subband.

SUMMARY

In general, this disclosure relates to techniques for performing scalable audio coding using cooperative pyramid vector quantization (PVQ). PVQ is used in compression of different forms of media such as audio and video. To perform PVQ, an audio encoder may map a residual vector to a vector of quantized integers over a hyperspace defined by the PVQ. The audio encoder then performs enumeration to assign a unique ID to each codevector on the hyperspace. Enumeration is a lossless process and IDs are created in a way to uniquely identify any codevector in the codebook.

The mapping of a vector may be parameterized by N and K. N represents the number of samples in the vector to be quantized and K represents the number of pulses to be included on the N-dimensional hypersurface. The level of quantization of a residual vector for a subband, and thus the loss, is dependent on the number of pulses. The number of pulses used for a subband is dependent on the number of bits allocated to encoding the residual vector in the subband. Subbands that are allocated higher numbers of bits may be encoded using more pulses, which may result in less distortion (i.e., loss) than subbands that are allocated lower numbers of bits.

In accordance with one or more techniques of this disclosure, an audio encoder may dynamically and cooperatively allocate bits for performing PVQ of residual vectors in a plurality of subbands of audio data. In this context, cooperative allocation of bits may be interpreted as allocating bits across all of the subbands while taking into account the total effect of the bit allocation. This may be contrasted with non-cooperative bit allocation where bits are allocated subband by subband without taking into account the total effect of the bit allocation.

In this respect, the techniques may include a method of encoding audio data in a quality scalable mode using cooperative pyramid vector quantization. An example of such a method includes separating audio data into a plurality of subbands; generating, for each subband, a respective energy scalar and a respective residual vector; determining overall distortion levels for a plurality of candidate subband pulse allocations for performing pyramid vector quantization (PVQ) of the residual vectors; selecting, from the plurality of subband pulse allocations and based on the overall distortion levels, a candidate subband pulse allocation; and performing, using the candidate subband pulse allocation, PVQ on the residual vectors.

The techniques may include a method of encoding audio data in a bitrate scalable mode using cooperative pyramid vector quantization. An example of such a method includes separating audio data into a plurality of subbands; generating, for each subband, a respective energy scalar and a respective residual vector; allocating, to each respective subband and based on perceptual weights assigned to the subbands, a respective number of bits for performing pyramid vector quantization (PVQ) of the residual vector of the respective subband; determining, for each respective subband and based on the number of bits allocated to each respective subband, a number of pulses for performing PVQ of the residual vector of the respective subband; and performing, using the determined numbers of pulses, PVQ on the residual vectors.

The details of one or more aspects of the techniques are set forth in the accompanying drawings and the description below. Other features, objects, and advantages of these techniques will be apparent from the description and drawings, and from the claims.

DETAILED DESCRIPTION

Figure 1:
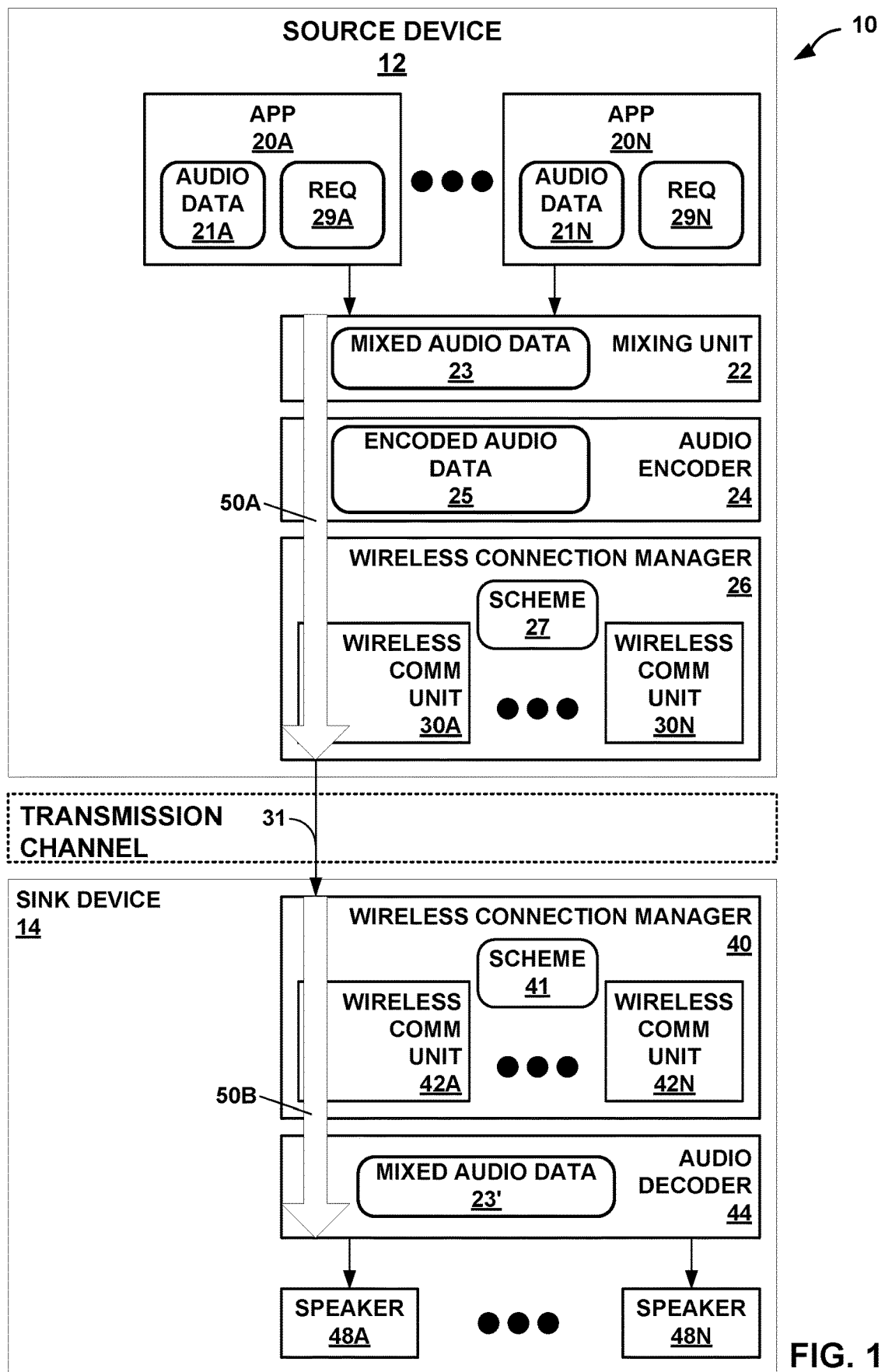
FIG. 1 is a block diagram illustrating a system that may perform various aspects of the techniques described in this disclosure.

FIG. 1 is a diagram illustrating a system 10 that may perform various aspects of the techniques described in this disclosure for extended-range coarse-fine quantization of audio data. As shown in the example of FIG. 1, the system 10 includes a source device 12 and a sink device 14. Although described with respect to the source device 12 and the sink device 14, the source device 12 may operate, in some instances, as the sink device, and the sink device 14 may, in these and other instances, operate as the source device. As such, the example of system 10 shown in FIG. 1 is merely one example illustrative of various aspects of the techniques described in this disclosure.

In any event, the source device 12 may represent any form of computing device capable of implementing the techniques described in this disclosure, including a handset (or cellular phone), a tablet computer, a so-called smart phone, a remotely piloted aircraft (such as a so-called "drone"), a robot, a desktop computer, a receiver (such as an audio/visual—AV—receiver), a set-top box, a television (including so-called "smart televisions"), a media player (such as s digital video disc player, a streaming media player, a Blue-Ray Disc™ player, etc.), or any other device capable of communicating audio data wirelessly to a sink device via a personal area network (PAN). For purposes of illustration, the source device 12 is assumed to represent a smart phone.

The sink device 14 may represent any form of computing device capable of implementing the techniques described in this disclosure, including a handset (or cellular phone), a tablet computer, a smart phone, a desktop computer, a wireless headset (which may include wireless headphones that include or exclude a microphone, and so-called smart wireless headphones that include additional functionality such as fitness monitoring, on-board music storage and/or playback, dedicated cellular capabilities, etc.), a wireless speaker (including a so-called "smart speaker"), a watch (including so-called "smart watches"), or any other device capable of reproducing a soundfield based on audio data communicated wirelessly via the PAN. Also, for purposes of illustration, the sink device 14 is assumed to represent wireless headphones.

As shown in the example of FIG. 1, the source device 12 includes one or more applications ("apps") 20A-20N ("apps 20"), a mixing unit 22, an audio encoder 24, and a wireless connection manager 26. Although not shown in the example of FIG. 1, the source device 12 may include a number of other elements that support operation of apps 20, including an operating system, various hardware and/or software interfaces (such as user interfaces, including graphical user interfaces), one or more processors, memory, storage devices, and the like.

Each of the apps 20 represent software (such as a collection of instructions stored to a non-transitory computer readable media) that configure the system 10 to provide some functionality when executed by the one or more processors of the source device 12. The apps 20 may, to list a few examples, provide messaging functionality (such as access to emails, text messaging, and/or video messaging), voice calling functionality, video conferencing functionality, calendar functionality, audio streaming functionality, direction functionality, mapping functionality, gaming functionality. Apps 20 may be first party applications designed and developed by the same company that designs and sells the operating system executed by the source device 12 (and often pre-installed on the source device 12) or third-party applications accessible via a so-called "app store" or possibly pre-installed on the source device 12. Each of the apps 20, when executed, may output audio data 21A-21N ("audio data 21"), respectively. In some examples, the audio data 21 may be generated from a microphone (not pictured) connected to the source device 12.

The mixing unit 22 represents a unit configured to mix one or more of audio data 21A-21N ("audio data 21") output by the apps 20 (and other audio data output by the operating system—such as alerts or other tones, including keyboard press tones, ringtones, etc.) to generate mixed audio data 23. Audio mixing may refer to a process whereby multiple sounds (as set forth in the audio data 21) are combined into one or more channels. During mixing, the mixing unit 22 may also manipulate and/or enhance volume levels (which may also be referred to as "gain levels"), frequency content, and/or panoramic position of the audio data 21. In the context of streaming the audio data 21 over a wireless PAN session, the mixing unit 22 may output the mixed audio data 23 to the audio encoder 24.

The audio encoder 24 may represent a unit configured to encode the mixed audio data 23 and thereby obtain encoded audio data 25. In some examples, the audio encoder 24 may encode individual ones of the audio data 21. Referring for purposes of illustration to one example of the PAN protocols, Bluetooth® provides for a number of different types of audio codecs (which is a word resulting from combining the words "encoding" and "decoding") and is extensible to include vendor specific audio codecs. The Advanced Audio Distribution Profile (A2DP) of Bluetooth® indicates that support for A2DP requires supporting a subband codec specified in A2DP. A2DP also supports codecs set forth in MPEG-1 Part 3 (MP2), MPEG-2 Part 3 (MP3), MPEG-2 Part 7 (advanced audio coding—AAC), MPEG-4 Part 3 (high efficiency-AAC—HE-AAC), and Adaptive Transform Acoustic Coding (ATRAC). Furthermore, as noted above, A2DP of Bluetooth® supports vendor specific codecs, such as aptX™ and various other versions of aptX (e.g., enhanced aptX—E-aptX, aptX live, and aptX high definition—aptX-HD).

The audio encoder 24 may operate consistent with one or more of any of the above listed audio codecs, as well as, audio codecs not listed above, but that operate to encode the mixed audio data 23 to obtain the encoded audio data 25. The audio encoder 24 may output the encoded audio data 25 to one of the wireless communication units 30 (e.g., the wireless communication unit 30A) managed by the wireless connection manager 26. In accordance with example techniques of this disclosure that will be described in more detail below, the audio encoder 24 may be configured to encode the audio data 21 and/or the mixed audio data 23 using a cooperative pyramid vector quantization technique.

The wireless connection manager 26 may represent a unit configured to allocate bandwidth within certain frequencies of the available spectrum to the different ones of the wireless communication units 30. For example, the Bluetooth® communication protocols operate over within the 2.5 GHz range of the spectrum, which overlaps with the range of the spectrum used by various WLAN communication protocols. The wireless connection manager 26 may allocate some portion of the bandwidth during a given time to the Bluetooth® protocol and different portions of the bandwidth during a different time to the overlapping WLAN protocols. The allocation of bandwidth and other is defined by a scheme 27. The wireless connection manager 40 may expose various application programmer interfaces (APIs) by which to adjust the allocation of bandwidth and other aspects of the communication protocols so as to achieve a specified quality of service (QoS). That is, the wireless connection manager 40 may provide the API to adjust the scheme 27 by which to control operation of the wireless communication units 30 to achieve the specified QoS.

In other words, the wireless connection manager 26 may manage coexistence of multiple wireless communication units 30 that operate within the same spectrum, such as certain WLAN communication protocols and some PAN protocols as discussed above. The wireless connection manager 26 may include a coexistence scheme 27 (shown in FIG. 1 as "scheme 27") that indicates when (e.g., an interval) and how many packets each of the wireless communication units 30 may send, the size of the packets sent, and the like.

The wireless communication units 30 may each represent a wireless communication unit 30 that operates in accordance with one or more communication protocols to communicate encoded audio data 25 via a transmission channel to the sink device 14. In the example of FIG. 1, the wireless communication unit 30A is assumed for purposes of illustration to operate in accordance with the Bluetooth® suite of communication protocols. It is further assumed that the wireless communication unit 30A operates in accordance with A2DP to establish a PAN link (over the transmission channel) to allow for delivery of the encoded audio data 25 from the source device 12 to the sink device 14.

More information concerning the Bluetooth® suite of communication protocols can be found in a document entitled "Bluetooth Core Specification v 5.0," published Dec. 6, 2016, and available at: www.bluetooth.org/en-us/specification/adopted-specifications. More information concerning A2DP can be found in a document entitled "Advanced Audio Distribution Profile Specification," version 1.3.1, published on Jul. 14, 2015.

The wireless communication unit 30A may output the encoded audio data 25 as a bitstream 31 to the sink device 14 via a transmission channel, which may be a wired or wireless channel, a data storage device, or the like. While shown in FIG. 1 as being directly transmitted to the sink device 14, the source device 12 may output the bitstream 31 to an intermediate device positioned between the source device 12 and the sink device 14. The intermediate device may store the bitstream 31 for later delivery to the sink device 14, which may request the bitstream 31. The intermediate device may comprise a file server, a web server, a desktop computer, a laptop computer, a tablet computer, a mobile phone, a smart phone, or any other device capable of storing the bitstream 31 for later retrieval by an audio decoder. This intermediate device may reside in a content delivery network capable of streaming the bitstream 31 (and possibly in conjunction with transmitting a corresponding video data bitstream) to subscribers, such as the sink device 14, requesting the bitstream 31.

Alternatively, the source device 12 may store the bitstream 31 to a storage medium, such as a compact disc, a digital video disc, a high definition video disc or other storage media, most of which may be capable of being read by a computer and therefore may be referred to as computer-readable storage media or non-transitory computer-readable storage media. In this context, the transmission channel may refer to those channels by which content stored to these mediums are transmitted (and may include retail stores and other store-based delivery mechanism). In any event, the techniques of this disclosure should not therefore be limited in this respect to the example of FIG. 1.

As further shown in the example of FIG. 1, the sink device 14 includes a wireless connection manager 40 that manages one or more of wireless communication units 42A-42N ("wireless communication units 42") according to a scheme 41, an audio decoder 44, and one or more speakers 48A-48N ("speakers 48"). The wireless connection manager 40 may operate in a manner similar to that described above with respect to the wireless connection manager 26, exposing an API to adjust scheme 41 by which operation of the wireless communication units 42 to achieve a specified QoS.

The wireless communication units 42 may be similar in operation to the wireless communication units 30, except that the wireless communication units 42 operate reciprocally to the wireless communication units 30 to decapsulate the encoded audio data 25. One of the wireless communication units 42 (e.g., the wireless communication unit 42A) is assumed to operate in accordance with the Bluetooth® suite of communication protocols and reciprocal to the wireless communication protocol 28A. The wireless communication unit 42A may output the encoded audio data 25 to the audio decoder 44.

The audio decoder 44 may operate in a manner that is reciprocal to the audio encoder 24. The audio decoder 44 may operate consistent with one or more of any of the above listed audio codecs, as well as, audio codecs not listed above, but that operate to decode the encoded audio data 25 to obtain mixed audio data 23'. The prime designation with respect to "mixed audio data 23" denotes that there may be some loss due to quantization or other lossy operations that occur during encoding by the audio encoder 24. The audio decoder 44 may output the mixed audio data 23' to one or more of the speakers 48.

Each of the speakers 48 represent a transducer configured to reproduce a soundfield from the mixed audio data 23'. The transducer may be integrated within the sink device 14 as shown in the example of FIG. 1 or may be communicatively coupled to the sink device 14 (via a wire or wirelessly). The speakers 48 may represent any form of speaker, such as a loudspeaker, a headphone speaker, or a speaker in an earbud. Furthermore, although described with respect to a transducer, the speakers 48 may represent other forms of speakers, such as the "speakers" used in bone conducting headphones that send vibrations to the upper jaw, which induces sound in the human aural system.

As noted above, the apps 20 may output audio data 21 to the mixing unit 22. Prior to outputting the audio data 21, the apps 20 may interface with the operating system to initialize an audio processing path for output via integrated speakers (not shown in the example of FIG. 1) or a physical connection (such as a mini-stereo audio jack, which is also known as 3.5 millimeter—mm—minijack). As such, the audio processing path may be referred to as a wired audio processing path considering that the integrated speaker is connected by a wired connection similar to that provided by the physical connection via the mini-stereo audio jack. The wired audio processing path may represent hardware or a combination of hardware and software that processes the audio data 21 to achieve a target quality of service (QoS).

To illustrate, one of the apps 20 (which is assumed to be the app 20A for purposes of illustration) may issue, when initializing or reinitializing the wired audio processing path, one or more request 29A for a particular QoS for the audio data 21A output by the app 20A. The request 29A may specify, as a couple of examples, a high latency (that results in high quality) wired audio processing path, a low latency (that may result in lower quality) wired audio processing path, or some intermediate latency wired audio processing path. The high latency wired audio processing path may also be referred to as a high quality wired audio processing path, while the low latency wired audio processing path may also be referred to as a low quality wired audio processing path.

Figure 2:
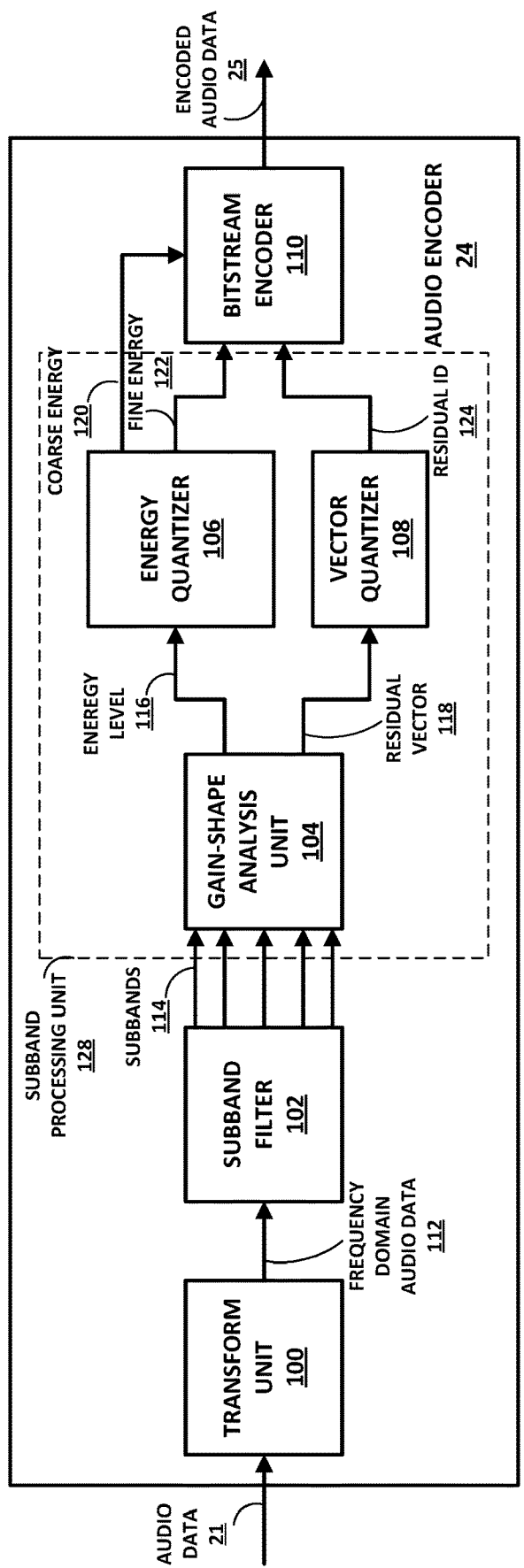
FIG. 2 is a block diagram illustrating an example audio encoder configured to perform various aspects of the techniques described in this disclosure.

FIG. 2 is a block diagram illustrating an example of an audio encoder 24 configured to perform various aspects of the techniques described in this disclosure. The audio encoder 24 may be configured to encode audio data for transmission over a PAN (e.g., Bluetooth®). However, the techniques of this disclosure performed by the audio encoder 24 may be used in any context where the compression of audio data is desired. In some examples, the audio encoder 24 may be configured to encode the audio data 21 in accordance with as aptX™ audio codec, including, e.g., enhanced aptX—E-aptX, aptX live, and aptX high definition. However, the techniques of this disclosure may be used in any audio codec configured to perform cooperative pyramid vector quantization (PVQ) of audio data. As will be explained in more detail below, the audio encoder 24 may be configured to perform various aspects of a cooperative PVQ process in accordance with techniques of this disclosure.

In the example of FIG. 2, the audio encoder 24 may be configured to encode the audio data 21 (or the mixed audio data 23) using a gain-shape vector quantization encoding process that includes an extended-range coarse-fine quantization process. In a gain-shape vector quantization encoding process, the audio encoder 24 is configured to encode both a gain (e.g., an energy level) and a shape (e.g., a residual vector defined by transform coefficients) of a subband of frequency domain audio data. Each subband of frequency domain audio data represents a certain frequency range of a particular frame of the audio data 21.

The audio data 21 may be sampled at a particular sampling frequency. Example sampling frequencies may include 48 kHz or 44.1 kHZ, though any desired sampling frequency may be used. Each digital sample of the audio data 21 may be defined by a particular input bit depth, e.g., 16 bits or 24 bits. In one example, the audio encoder 24 may be configured to operate on a single channel of the audio data 21 (e.g., mono audio). In another example, the audio encoder 24 may be configured to independently encode two or more channels of the audio data 21. For example, the audio data 21 may include left and right channels for stereo audio. In this example, the audio encoder 24 may be configured to encode the left and right audio channels independently in a dual mono mode. In other examples, the audio encoder 24 may be configured to encode two or more channels of the audio data 21 together (e.g., in a joint stereo mode). For example, the audio encoder 24 may perform certain compression operations by predicting one channel of the audio data 21 with another channel of the audio data 21.

Regardless of how the channels of the audio data 21 are arranged, the audio encoder 24 recited the audio data 21 and sends that audio data 21 to a transform unit 100. The transform unit 100 is configured to transform a frame of the audio data 21 from the time domain to the frequency domain to produce frequency domain audio data 112. A frame of the audio data 21 may be represented by a predetermined number of samples of the audio data. In one example, a frame of the audio data 21 may be 1024 samples wide. Different frame widths may be chosen based on the frequency transform being used and the amount of compression desired. The frequency domain audio data 112 may be represented as transform coefficients, where the value of each the transform coefficients represents an energy of the frequency domain audio data 112 at a particular frequency.

In one example, the transform unit 100 may be configured to transform the audio data 21 into the frequency domain audio data 112 using a modified discrete cosine transform (MDCT). An MDCT is a "lapped" transform that is based on a type-IV discrete cosine transform. The MDCT is considered "lapped" as it works on data from multiple frames. That is, in order to perform the transform using an MDCT, transform unit 100 may include a fifty percent overlap window into a subsequent frame of audio data. The overlapped nature of an MDCT may be useful for data compression techniques, such as audio encoding, as it may reduce artifacts from coding at frame boundaries. The transform unit 100 need not be constrained to using an MDCT but may use other frequency domain transformation techniques for transforming the audio data 21 into the frequency domain audio data 112.

A subband filter 102 separates the frequency domain audio data 112 into subbands 114. Each of the subbands 114 includes transform coefficients of the frequency domain audio data 112 in a particular frequency range. For instance, the subband filter 102 may separate the frequency domain audio data 112 into twenty different subbands. In some examples, subband filter 102 may be configured to separate the frequency domain audio data 112 into subbands 114 of uniform frequency ranges. In other examples, subband filter 102 may be configured to separate the frequency domain audio data 112 into subbands 114 of non-uniform frequency ranges.

For example, subband filter 102 may be configured to separate the frequency domain audio data 112 into subbands 114 according to the Bark scale. In general, the subbands of a Bark scale have frequency ranges that are perceptually equal distances. That is, the subbands of the Bark scale are not equal in terms of frequency range, but rather, are equal in terms of human aural perception. In general, subbands at the lower frequencies will have fewer transform coefficients, as lower frequencies are easier to perceive by the human aural system. As such, the frequency domain audio data 112 in lower frequency subbands of the subbands 114 is less compressed by the audio encoder 24, as compared to higher frequency subbands. Likewise, higher frequency subbands of the subbands 114 may include more transform coefficients, as higher frequencies are harder to perceive by the human aural system. As such, the frequency domain audio 112 in data in higher frequency subbands of the subbands 114 may be more compressed by the audio encoder 24, as compared to lower frequency subbands.

The audio encoder 24 may be configured to process each of subbands 114 using a subband processing unit 128. That is, the subband processing unit 128 may be configured to process each of subbands separately. The subband processing unit 128 may be configured to perform a gain-shape vector quantization process with extended-range coarse-fine quantization in accordance with techniques of this disclosure.

A gain-shape analysis unit 104 may receive the subbands 114 as an input. For each of subbands 114, the gain-shape analysis unit 104 may determine an energy level 116 of each of the subbands 114. That is, each of subbands 114 has an associated energy level 116. The energy level 116 is a scalar value in units of decibels (dBs) that represents the total amount of energy (also called gain) in the transform coefficients of a particular one of subbands 114. The gain-shape analysis unit 104 may separate energy level 116 for one of subbands 114 from the transform coefficients of the subbands to produce residual vector 118. The residual vector 118 represents the so-called "shape" of the subband. The shape of the subband may also be referred to as the spectrum of the subband.

A vector quantizer 108 may be configured to quantize the residual vector 118. In one example, the vector quantizer 108 may quantize the residual vector using a pyramid vector quantization (PVQ) process to produce the residual ID 124. Instead of quantizing each sample separately (e.g., scalar quantization), the vector quantizer 108 may be configured to quantize a block of samples included in the residual vector 118 (e.g., a shape vector). In some examples, the vector quantizer 108 may use a Linde-Buzo-Gray (LBG) algorithm to perform the vector quantization. A Linde-Buzo-Gray (LBG) algorithm typically results in less distortion with a fixed available bit-rate compared to scalar quantization. However, any vector quantization techniques method can be used along with the extended-range coarse-fine energy quantization techniques of this disclosure.

For example, the vector quantizer 108 may use structured vector quantization algorithms reduce storage and computational complexity LGB algorithms. A structured vector quantization may involve performing the quantization based upon a set of structured code-vectors that do not need to be stored explicitly and can be identified functionally. Examples of the structured vector quantizers include Lattice vector quantizers and Pyramid Vector Quantizers (PVQ). One example of how PVQ may be used is described in A. C. Hung, E. K. Tsern and T. H. Meng, "Error-resilient pyramid vector quantization for image compression," in *IEEE Transactions on Image Processing*, vol. 7, no. 10, pp. 1373-1386, October 1998. Using PVQ, the vector quantizer 108 may be configured to map the residual vector 118 to a hyperpyramid (with constant L1 norm) or a hypersphere (with constant L2 norm) and quantize the residual vector 118 upon the underlying structured codebook. The quantization code-vectors are then enumerated and assigned an ID (e.g., the residual ID 124) to be encoded and transmitted. The quality of the mapping drives the accuracy of the quantization, while the number of enumeration code-vectors specifies the shape transmission rate.

In some examples, the audio encoder 24 may dynamically allocate bits for coding the energy level 116 and the residual vector 118. That is, for each of subbands 114, the audio encoder 24 may determine the number of bits allocated for energy quantization (e.g., by the energy quantizer 106) and the number of bits allocated for vector quantization (e.g., by the vector quantizer 108). As will be explained in more detail below, the total number of bits allocated for energy quantization may be referred to as energy-assigned bits. These energy-assigned bits may then be allocated between a coarse quantization process and a fine quantization process.

An energy quantizer 106 may receive the energy level 116 of the subbands 114 and quantize the energy level 116 of the subbands 114 into a coarse energy 120 and a fine energy 122. This disclosure will describe the quantization process for one subband, but it should be understood that the energy quantizer 106 may perform energy quantization on one or more of the subbands 114, including each of the subbands 114. In general, the energy quantizer 106 may perform a two-step quantization process. Energy quantizer 106 may first quantize the energy level 116 with a first number of bits for a coarse quantization process to generate the coarse energy 120. The energy quantizer 106 may generate the coarse energy using a predetermined range of energy levels for the quantization (e.g., the range defined by a maximum and a minimum energy level. The coarse energy 120 approximates the value of the energy level 116. The energy quantizer 106 may then determine a difference between the coarse energy 120 and the energy level 116. This difference is sometimes called a quantization error. The energy quantizer 106 may then quantize the quantization error using a second number of bits in a fine quantization process to produce the fine energy 122. The number of bits used for the fine quantization bits is determined by the total number of energy-assigned bits minus the number of bits used for the coarse quantization process. When added together, the coarse energy 120 and the fine energy 122 represent a total quantized value of the energy level 116.

The audio encoder 24 may be further configured encode the coarse energy 120, the fine energy 122, and the residual ID 124 using a bitstream encoder 110 to create the encoded audio data 25. The bitstream encoder 110 may be configured to further compress the coarse energy 120, the fine energy 122, and the residual ID 124 using one or more entropy encoding techniques. Entropy encoding techniques may include Huffman coding, arithmetic coding, context-adaptive binary arithmetic coding (CABAC), and other similar encoding techniques. The encoded audio data 25 may then be transmitted to the sink device 14 and/or stored in a memory for later use.

In one example of the disclosure, the quantization performed by the energy quantizer 106 is a uniform quantization. That is, the step sizes (also called "resolution) of each quantization are equal. In some examples, the steps sizes may be in units of decibels (dBs). The step size for the coarse quantization and the fine quantization may be determined, respectively, from a predetermined range of energy values for the quantization and the number of bits allocated for the quantization. In one example, the energy quantizer 106 performs uniform quantization for both coarse quantization (e.g., to produce the coarse energy 120) and fine quantization (e.g., to produce the fine energy 122).

Performing a two-step, uniform quantization process is equivalent to performing a single uniform quantization process. However, by splitting the uniform quantization into two parts, the bits allocated to coarse quantization and fine quantization may be independently controlled. This may allow for more flexibility in the allocation of bits across energy and vector quantization and may improve compression efficiency. Consider an M-level uniform quantizer, where M defines the number of levels (e.g., in dB) into which the energy level may be divided. M may be determined by the number of bits allocated for the quantization. For example, the energy quantizer 106 may use M1 levels for coarse quantization and M2 levels for fine quantization. This is equivalent to a single uniform quantizer using M1*M2 levels.

Figure 3:
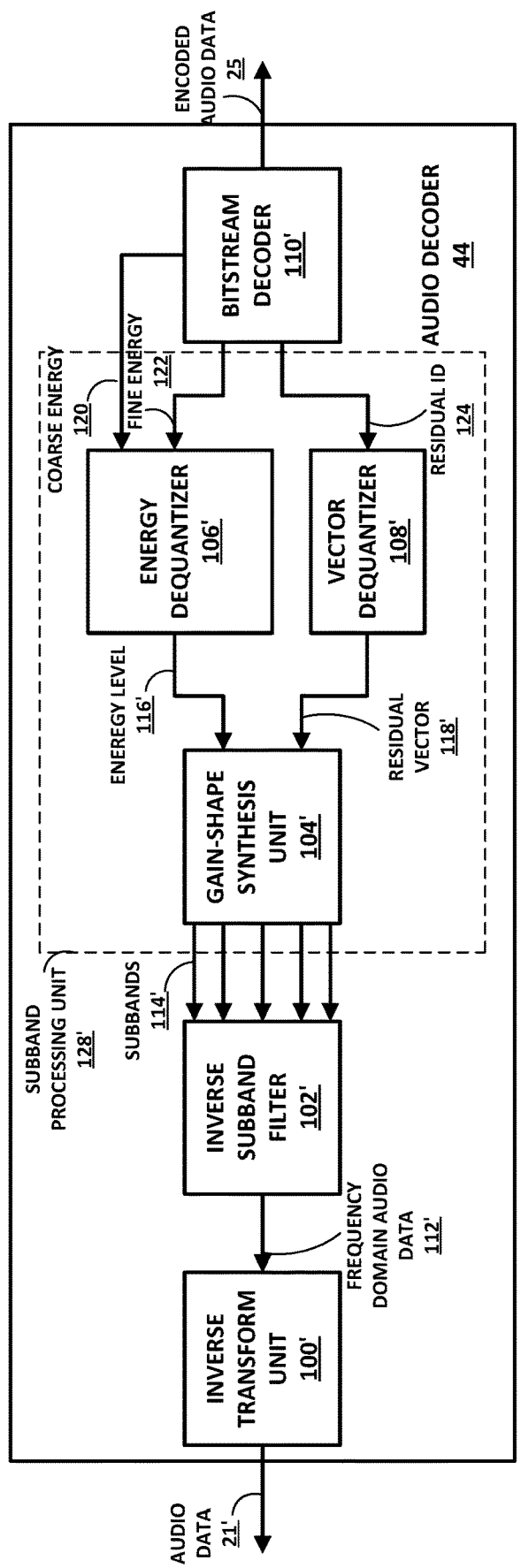
FIG. 3 is a block diagram illustrating an example of an audio decoder configured to perform various aspects of the techniques described in this disclosure.

FIG. 3 is a block diagram illustrating an example of an audio decoder 44 configured to perform various aspects of the techniques described in this disclosure. The audio decoder 44 may be configured to decode audio data received over a PAN (e.g., Bluetooth®). However, the techniques of this disclosure performed by the audio decoder 44 may be used in any context where the compression of audio data is desired. In some examples, the audio decoder 44 may be configured to decode the audio data 21' in accordance with as aptX™ audio codec, including, e.g., enhanced aptX—E-aptX, aptX live, and aptX high definition. However, the techniques of this disclosure may be used in any audio codec configured to perform cooperative pyramid vector quantization (PVQ) of audio data. As will be explained in more detail below, the audio decoder 44 may be configured to perform various aspects of a cooperative PVQ process in accordance with techniques of this disclosure.

In general, audio decoder 44 may operate in a reciprocal manner with respect to audio encoder 24. As such, the same process used in the encoder for quality/bitrate scalable cooperative PVQ can be used in the audio decoder 44. The decoding is based on the same principals, with inverse of the operations conducted in the decoder, so that audio data can be reconstructed from the encoded bitstream received from encoder. Each quantizer has an associated unquantizater counterpart. For example, as shown in FIG. 3, inverse transform unit 100', inverse subband filter 102', gain-shape synthesis unit 104', energy dequantizer 106', vector dequantizer 108', and bitstream decoder 110' may be respectively configured to perform inverse operations with respect to transform unit 100, subband filter 102, gain-shape analysis unit 104, energy quantizer 106, vector quantizer 108, and bitstream encoder 110 of FIG. 2.

In particular, the gain-shape synthesis unit 104' reconstructs the frequency domain audio data, having the reconstructed residual vectors along with the reconstructed energy levels. The inverse subband filter 102' and the inverse transform unit 100' output the reconstructed audio data 21'. In examples where the encoding is lossless, the reconstructed audio data 21' may perfectly match the audio data 21. In examples where the encoding is lossy, the reconstructed audio data 21' may not perfectly match the audio data 21.

Figure 4:
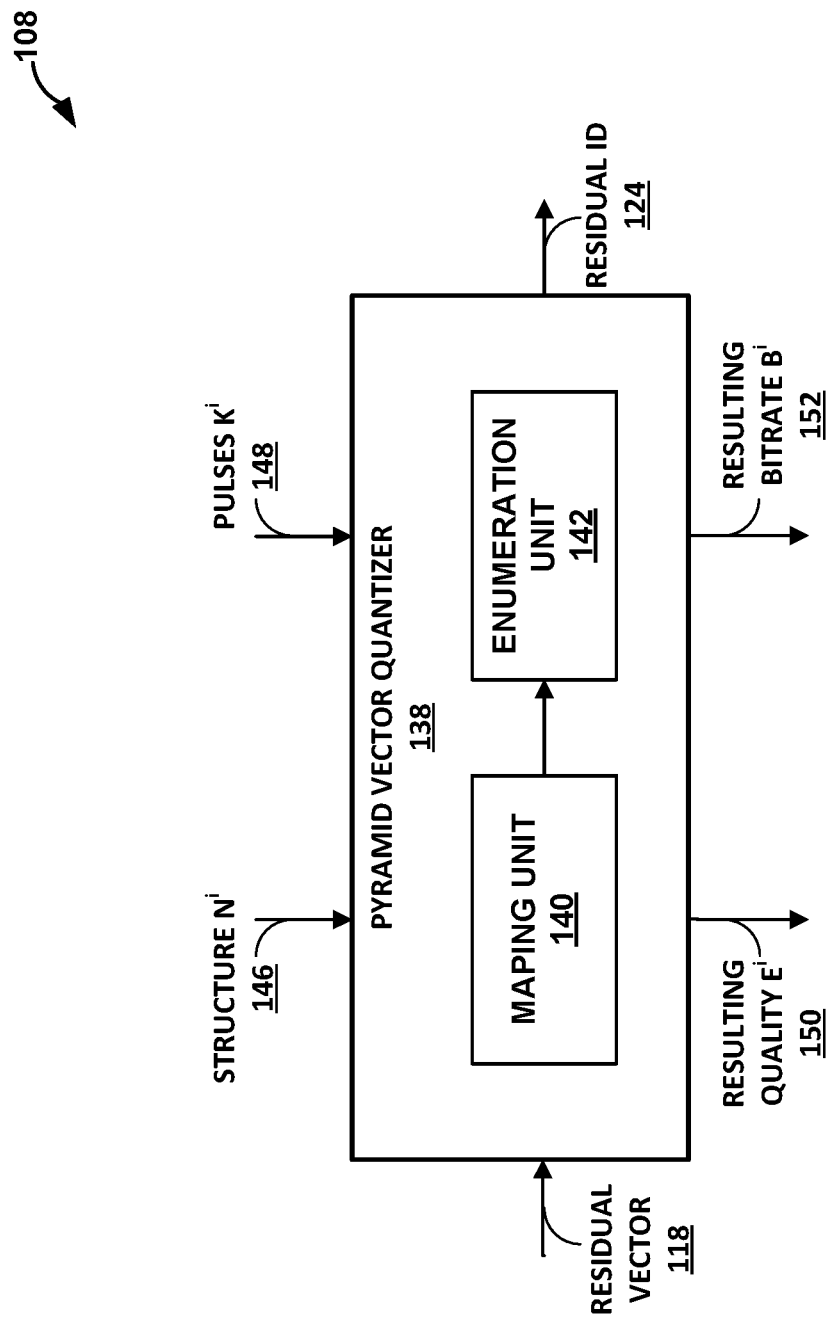
FIG. 4 is a block diagram illustrating an example vector quantizer configured to perform various aspects of the techniques described in this disclosure.

FIG. 4 is a block diagram illustrating an example vector quantizer 108 configured to perform various aspects of the techniques described in this disclosure. In particular, the vector quantizer 108 may include a pyramid vector quantizer 138 that is configured to perform pyramid vector quantization (PVQ) of residual vectors of audio data.

The residual vector 118 is input to the pyramid vector quantizer 138. As discussed above, the residual vector 118 is a residual vector of one of subbands 114 of frequency domain audio data. In operation, the pyramid vector quantizer 138 generates a residual ID 124 to encode the residual vector 118. As the residual vector 118 is a residual vector of one of subbands 114, the pyramid vector quantizer 138 may generate a separate residual ID 124 for each of the subbands 114 or vector quantizer 108 may include a separate pyramid vector quantizer 138 for each of the subbands 114. The assignment of residual IDs to the codevectors on the hypersurface may be a lossless process.

Figure 5:
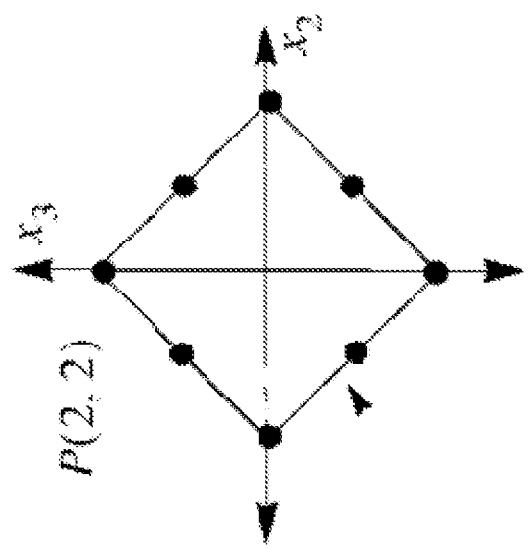
FIG. 5 is a conceptual diagram that illustrates an example hyperpyramid used for performing pyramid vector quantization.
Figure 5:
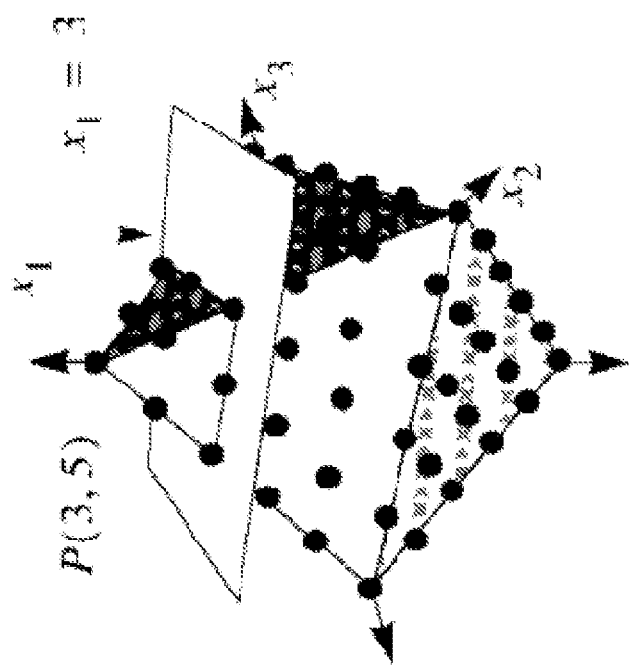

As shown in FIG. 4, the pyramid vector quantizer 138 includes a mapping unit 140 and an enumeration unit 142. To perform PVQ, the mapping unit 140 may map the residual vector 118 onto an N-dimensional hypersurface (e.g., a hyperpyramid) and the enumeration unit 142 may assign a unique identifier (ID) to each codevector on the hypersurface. The mapping of a residual vector may be parameterized by a structure N 146 and pulses K 148. The structure N 146 may represent the number of samples in the residual vector to be quantized (i.e., the number of samples in residual vector 118) and the pulses K 148 may represent the number of pulses to be included on the N-dimensional hypersurface. FIG. 5 is a conceptual diagram that illustrates an example hyperpyramid used for performing pyramid vector quantization. In the example of FIG. 5, the hyperpyramid had an N of 3 and a K of 5.

The level of quantization of the residual vector 118, and thus the loss, is dependent on the number of pulses K 148 used for the subband. The number of pulses K 148 used for a subband is dependent on the number of bits allocated to encoding the residual vector in the subband. Subbands that are allocated higher numbers of bits may be encoded using more pulses, which may result in less distortion (i.e., loss) than subbands that are allocated lower numbers of bits.

The below equations illustrate the relationship between the number of transform coefficients in subband m (represented by $N_m$), the number of pulses used to encode the residual vector in subband m (represented by $K_m$), and the number of bits allocated to encode the residual vector in subband m (represented by $b_m$).

$$V_m \equiv V(N_m, K_m)$$

$$b_m \equiv \log_2 V_m$$

As such, the total number of bits needed to encode the residual vectors for all subbands is defined by the following equation.

$$B \equiv \sum_{m=1}^{M} b_m = \sum_{m=1}^{M} \log_2 V_m = \log_2 \prod_{m=1}^{M} V_m$$

Assume P defines a partition operator over transform space $N^i \equiv \{N_m^i\}_{m=1}^{M}$ with assigned PVQ pulses of $K_i \equiv \{K_m^i\}_{m=1}^{M}$ which correspond to a codebook length of $V^i \equiv \{V_m^i\}_{m=1}^{M}$. For any given mapping algorithm, each partition will result in a different PVQ with different performance.

The human ear has different sensitivities for distortion in different subbands. A level of distortion in one subband may be substantially more noticeable to a person than the same level of distortion in another subband. Therefore, it is desirable for the total bit budget of B to be allocated amongst the various subbands to achieve the lowest level of overall distortion (e.g., to achieve the highest level of overall quality). In equation form, assume resulting quality $E^i$ 150 is a distortion measure obtained by applying a distortion evaluation operator E on $P^i$, defined as:

$$P^i = P(N^i, V^i)$$

Then $$E^i = E(P^i)$$

As such, it is desirable to find a partition optimizing the measure:

$$P^* \equiv \underset{p^i}{\arg\min} E^i$$

Unfortunately, due to the highly nonlinear form of the process of PVQ quantizing inputs and measure E, the optimization is not well-defined.

In accordance with one or more techniques of this disclosure, the vector quantizer 108 may maximize quality of the coding output while minimizing bitrate. The process of maximizing the quality while minimizing bitrate may be referred to as a quality-scalable approach. When encoding a residual vector (i.e., residual vector 118) using a quality-scalable approach, the vector quantizer 108 may assume a fixed bitrate and search for the best solution over a set of acceptable solutions. For instance, assuming that there is a maximum of $B_{max}$ bits available to be assigned to the residual quantization and coding, and assume that $B_R$ is the maximum number of bits each register in the implementation platform can contain (e.g., the register size of registers in audio encoder 24 used to implement the vector quantizer 108). Then the optimization problem may be defined as:

$$P^* \equiv \underset{p^i}{\operatorname{argmin}} E^i \ s.t. B \leq B_{max}, b_m \leq B_R, \forall\, m = 1, \ldots, M$$

Where P* is defined by finding a pair of N and V that provides the optimal E.

$$P^* = P(N^*, V^*)$$

Finding P* may be equivalent to finding the pair of (N*, V*). Both structure (partition) and parameters (number of pulses) of the PVQ can be changed to find the optimal solution. However, finding the exact optimum may be a complex problem of concurrently optimizing the structure and parameters. As such, in accordance with one or more techniques of this disclosure, the vector quantizer 108 may find the best K parameters resulting in V* for a given N. Assuming an initial N for the structure, the vector quantizer 108 can find the V* by finding K* which in turn, determines the total number of bits required. With the available $B_{max}$ number of bits, the vector quantizer 108 determines the best K that minimizes $E^i$. This solution (i.e., the best K that minimizes $E^i$) may be determined subject to the condition that the bits allocated to code each residual vector are less than the maximum number of bits each register in the implementation platform can contain (i.e., subject to each $b_m \leq B_R$). The resulting bitrate $B^i$ 152 may be the bitrate resulting from encoding the residual vectors using the identified solution.

In general, the vector quantizer 108 may determine/identify or otherwise obtain a good candidate for N based on some perceptual scaling of the frequency domain involving the assignment of more coefficients in subbands of lower frequency. In some examples, for simplicity of implementation and consistency in a gain-shape type quantization method, the vector quantizer 108 may utilize the same structure (N) as was used by energy quantizer 106 when performing energy quantization.

Figure 6:
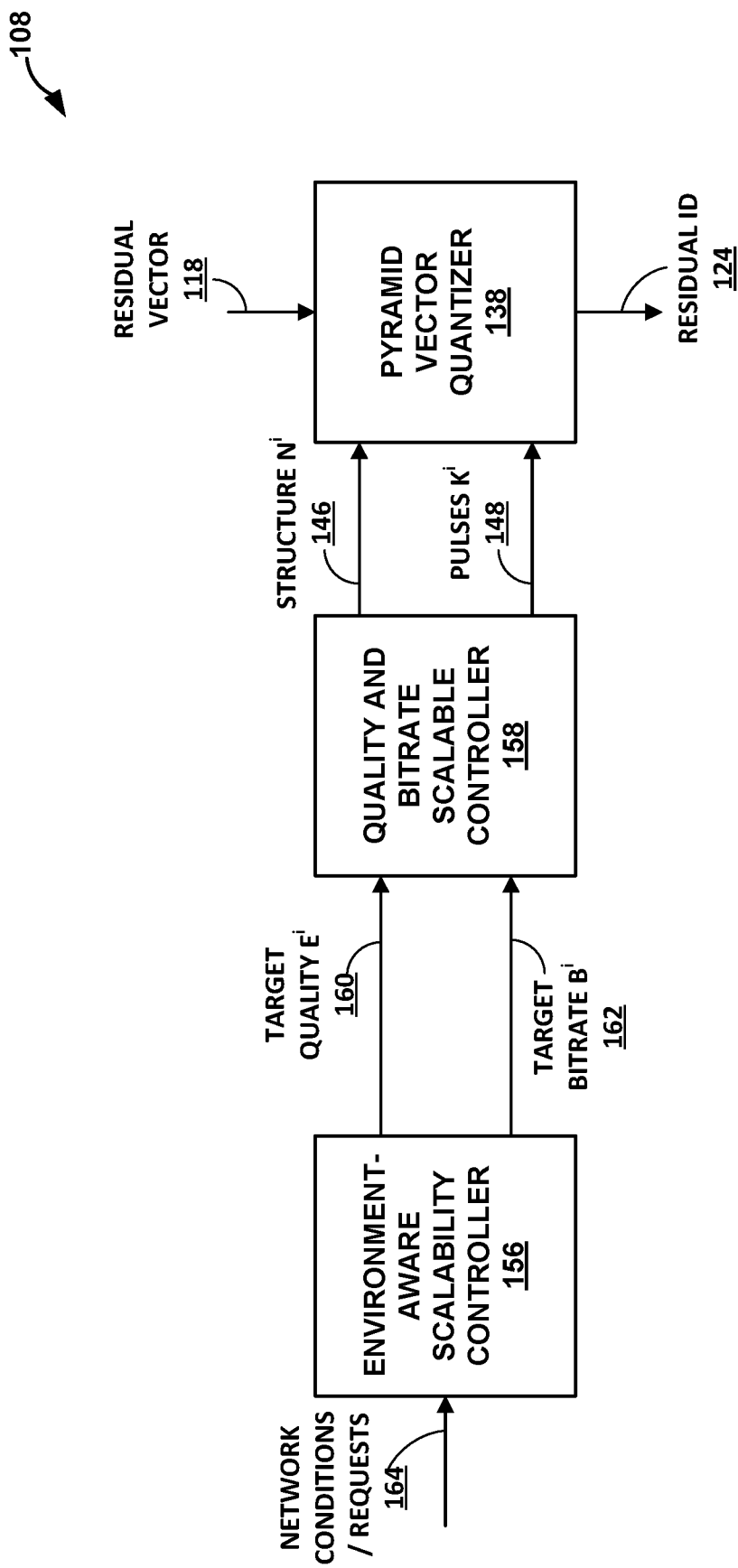
FIG. 6 is a block diagram illustrating an example vector quantizer configured to perform various aspects of the techniques described in this disclosure.

FIG. 6 is a block diagram illustrating an example vector quantizer 108 configured to perform various aspects of the techniques described in this disclosure. The conditions in which the source device 12 is transmitting audio data to sink device 14 may be dynamic. For instance, the bandwidth of transmission channel 31 available to the vector quantizer 108 for streaming quantized residual vectors (i.e., for streaming residual IDs 124) may change over time, even from frame to frame. For at least these reasons, it may be desirable for the vector quantizer 108 to be able to scale the quality and/or bitrate of the quantized residual vectors.

As shown in FIG. 6, the vector quantizer 108 may further include an environment-aware scalability controller (EASC) 156 and a quality and bitrate scalable controller (QBSC) 158. The EASC 156 may be configured to determine one or both of a target quality 160 or a target bitrate 162 for encoding the residual vectors 118. For instance, the EASC 156 determine one or both of the target quality 160 or the target bitrate 162 based on network condition or request information 164. The network condition or request information 164 may indicate any aspect of the conditions of the network being used to stream the audio data (e.g., conditions of transmission channel 31), or requests for a particular quality or bitrate level. The EASC 156 may provide the target quality 160 and/or the target bitrate 162 to one or more other components of audio encoder 24, such as QBSC 158.

QBSC 158 may determine, based at least in part on the target quality 160 or the target bitrate 162, the structure N 146 and the pulse allocation K 148 for use by pyramid vector quantizer 138 when encoding the residual vectors 118. In particular, QBSC 158 may determine the structure N 146 and the pulse allocation K 148 for each subband without individually and without regard for the other subbands. In this way, QBSC 158 may be considered to perform non-cooperative quality and bitrate scalability.

As discussed above and in accordance with one or more techniques of this disclosure, for various reasons (e.g., human ear frequency sensitivities), it may be desirable to perform quality and bitrate scalability in a cooperative manner. In particular, it may be desirable to take into account the total effect of bit/pulse allocation across all subbands when allocating bits/pulses to the individual subbands.

Figure 7:
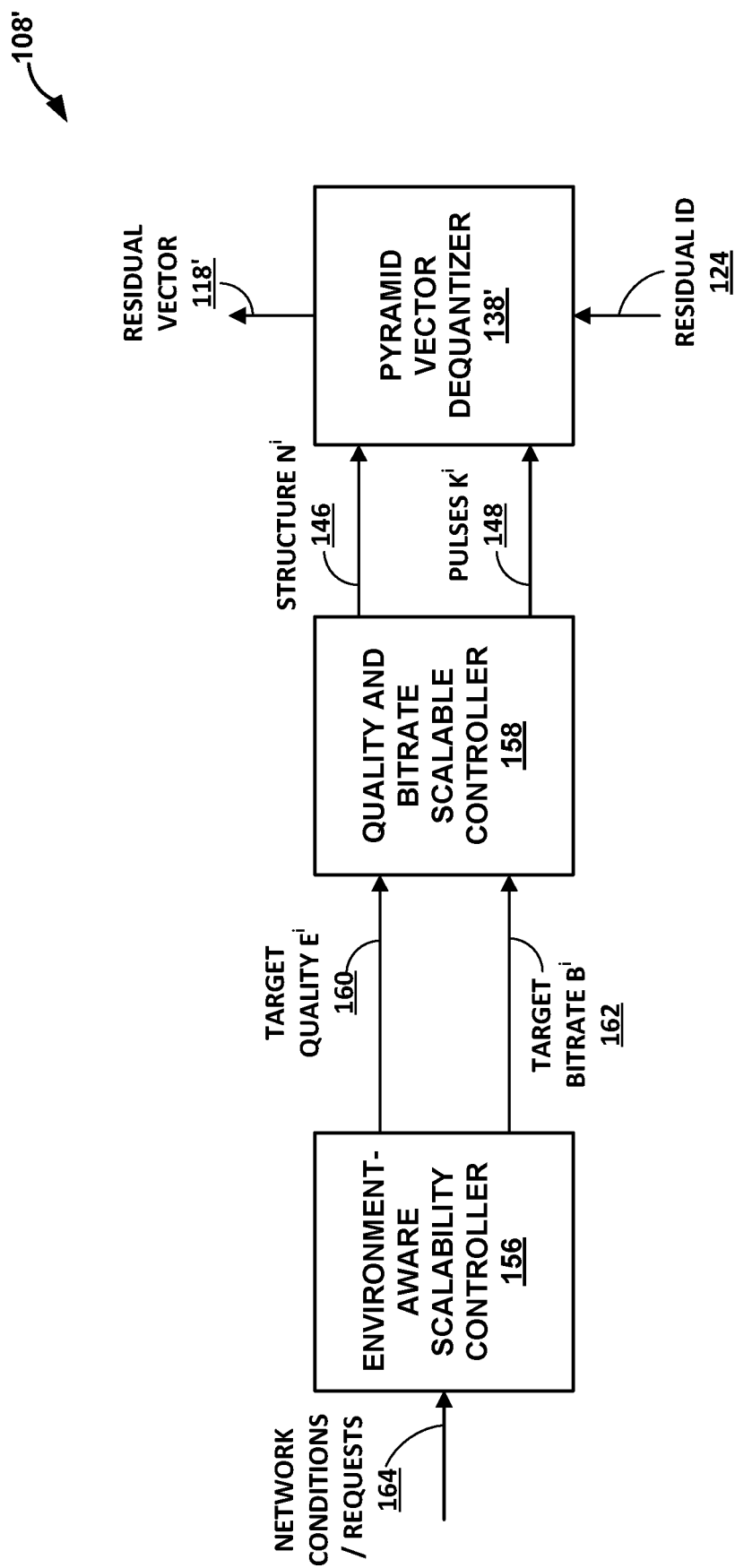
FIG. 7 is a block diagram illustrating an example vector dequantizer configured to perform various aspects of the techniques described in this disclosure.

FIG. 7 is a block diagram illustrating an example vector dequantizer 108' configured to perform various aspects of the techniques described in this disclosure. As discussed above, the conditions in which the source device 12 is transmitting audio data to sink device 14 may be dynamic. For instance, the bandwidth of transmission channel 31 available for streaming quantized residual vectors (i.e., for streaming residual IDs 124) may change over time, even from frame to frame. For at least these reasons, it may be desirable for the vector dequantizer 108' to be able to scale the quality and/or bitrate of the quantized residual vectors.

The pyramid vector dequantizer (PVdQ) 138' may be configured to perform an inverse operation to the PVQ 138 of FIG. 6. In particular, the PVdQ 138' may receive a residual ID 124 (e.g., as decoded from a bitstream) and generate a reconstructed residual vector 118' based on the received residual ID 124. Similar to the PVQ process, the PVuQ process can be fully characterized having its structure (N), and its number of pulses (K). The PVdQ 138' performs the inverse enumeration on residual IDs to identify the corresponding points on the pyramid surface. The associated quantized vectors with those points then, are regarded as the reconstructed residual vectors.

Figure 8:
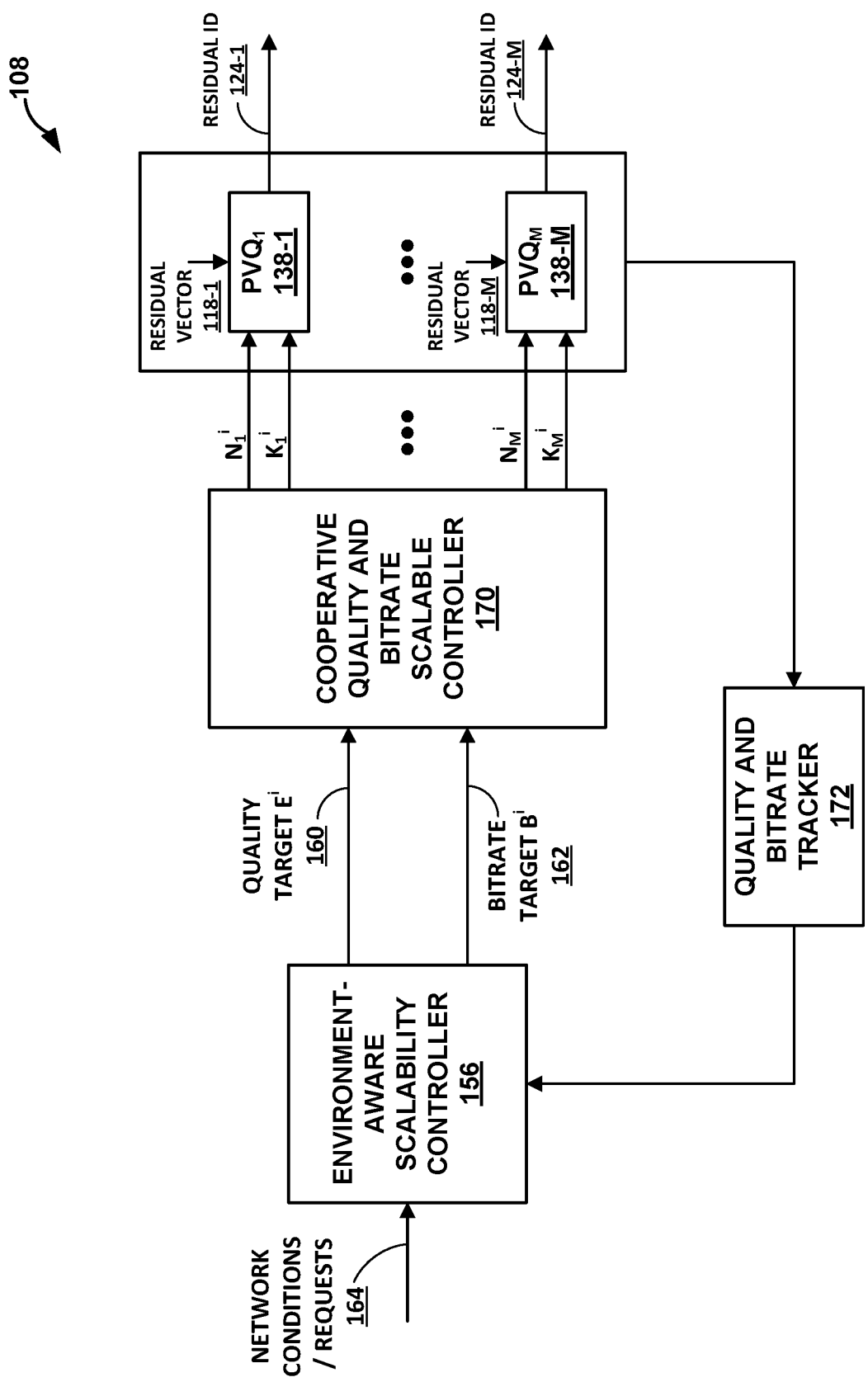
FIG. 8 is a block diagram illustrating an example vector quantizer configured to perform various aspects of the techniques described in this disclosure.

FIG. 8 is a block diagram illustrating an example vector quantizer 108 configured to perform various aspects of the techniques described in this disclosure. In particular, the vector quantizer 108 may be configured to perform the cooperative pyramid vector quantization techniques of this disclosure.

As shown in FIG. 8, the vector quantizer 108 may further include an environment-aware scalability controller (EASC) 156 and a cooperative quality and bitrate scalable controller (CQBSC) 158. The CQBSC 170 may determine, based at least in part on the target quality 160 or the target bitrate 162, a pulse allocation K for each subband for use by a corresponding pyramid vector quantizer of pyramid vector quantizers 138-1-138-M (collectively, "pyramid vector quantizers 138") when encoding the residual vectors 118-1-118-M. For instance, the CQBSC 170 may determine a pulse allocation $K_1^i$ for use by pyramid vector quantizer 138-1 when encoding residual vector 118-1 of a first subband and determine a pulse allocation $K_M^i$ for use by pyramid vector quantizer 138-M when encoding residual vector 118-M of a Mth subband.

As discussed above, the CQBSC 170 may determine the pulse allocations cooperatively. In particular, the CQBSC 170 may determine the pulse allocations amongst the subbands while taking into account the total effect of the allocation.

The CQBSC 170 may allocate pulses/bits in one of two modes: a quality scalable mode, or a bitrate scalable mode.

In the quality scalable mode, the CQBSC 170 may cooperatively allocate bits amongst the subbands in order to minimize distortion of the audio data while maintaining a relatively fixed bitrate. In the bitrate scalable mode, the CQBSC 170 may cooperatively allocate bits amongst the subbands in order to simultaneously minimize the distortion and the bitrate.

To allocate bits in the quality scalable mode, the CQBSC 170 may use an initial solution (i.e., allocation of pulses that uses less than or equal to a maximum number of bits available for encoding all of the residual vectors) as a seed to search for the best solution (i.e., the solution that has the lowest distortion without using more than the maximum number of bits available). For example, the CQBSC 170 may determine the overall distortion that would result from encoding residual vectors using the initial solution, perturb the distribution of pulses to obtain a new solution (i.e., change the distribution of pulses while keeping the total number of bits used, as close as possible, but less than or equal to, the maximum number of bits available), and determine the overall distortion that would result from encoding residual vectors using the new solution. The CQBSC 170 may continue to search for solutions until an end condition is met. Example end conditions include, but are not limited to, having evaluated a certain number of solutions (e.g., the audio encoder may stop after evaluating X solutions), and the distortion for an evaluated solution is less than a minimum distortion.

The following is example psudocode for a quality scalable mode:

```
Initialize( ):
  N: Consortia
  K⁰ ← {Kₘ⁰}ₘ₌₁ᴹ where Kₘ⁰: initial number of pulses assigned
  to
  subband m
  V⁰ ← {Vₘ⁰}ₘ₌₁ᴹ where Vₘ⁰ ≡ V(N, Kₘ⁰)
  bₘ⁰ ← log₂ Vₘ⁰ ∀m = 1, ... , M
  P⁰ ← P(N,V⁰)
  E⁰ ← E(P⁰)
  S_K ← { }
  S_E ← { }
  i ← 0
  L: Total number of solutions
  B_max: Maximum total number of bits
  B_R: Register length
Process( ):
  while |S_K| < L
    Bⁱ ← Σₘ₌₁ᴹ bₘⁱ
    if Bⁱ ≤ B_max & bₘⁱ ≤ B_R, ∀m = 1, ... , M
      Pⁱ ← P(N, Vⁱ)
      Eⁱ ← E(Pⁱ)
      S_K ← S_K ∪ {Kⁱ}
      S_E ← S_E ∪ {Eⁱ}
    end if
    i ← i + 1
    Kⁱ ← perturb(Kⁱ⁻¹, N, B_max, B_R)
    Vⁱ ← {Vₘⁱ}ₘ₌₁ᴹ where Vₘⁱ ≡ V(N, Kₘⁱ)
    bₘⁱ ← log₂ Vₘⁱ ∀m = 1, ... , M
  end while
  i* ← argmax_E S_E
  K* ← S_K{i*}
  return K*
```

In the above pseudocode, perturb may be a function that changes the distribution of pulses while keeping the total number of bits used, as close as possible, but less than or equal to $B_{max}$, with every single $b_m$ being less than or equal to $B_R$. As such, the perturb algorithm may define the search domain used to find the best solution.

To allocate bits in the bitrate scalable mode, the CQBSC 170 may allocate bits to subbands based on perceptual importance. In particular, the CQBSC 170 may assign weights to coefficients and sub-band group based on perceptual importance, and allocate bits based on the assigned weights. In this way, the CQBSC 170 may find the optimal solution K* that minimizes distortion (E) and bitrate (B) at the same time. The CQBSC 170 may compute bit distribution over transform coefficients by estimating optimal bit assignment using a large set of data where statistics of the coefficients are collected from audio data.

Let $p_{n,m}$ be the weight assigned to coefficient n in subband m, according to the estimated statistics. Then $$p_m \equiv \sum_{n=1}^{N_m} p_{n,m}$$

is the weight associated with each subband. The CQBSC 170 may then allocate bits to the subbands based on their respective weights. For instance, the CQBSC 170 may allocate bits amongst the subbands in accordance with the following equation where B is the total number of bits.

$$b_m = B \cdot p_m$$

As compared to quality scalable optimization where there was a relatively fixed bitrate and the search for the best solution was performed in the pulse domain directly, here, the CQBSC 170 may perform he search for the best solution in the bit domain as the total number of bits does not have to be kept fixed. As such, the CQBSC 170 may first allocate each subband a particular number of bits, and then convert the allocated number of bits into a number of pulses (that uses less than or equal to the allocated number of bits).

The following is example psudocode for the bitrate scalable mode:

```
Initialize( ):
  N: Groupings
  p ← {pₘ}ₘᴹ⁻¹ where pₘ: weight assigned to subband m
  S_B : Set of total number of bits
  S_K ← { }
  S_E ← { }
  i ← 0
  B_R: Register length
Process( ):
  for B in S_B
    i ← i + 1
    bₘⁱ ← B·pₘ ∀m = 1, ..., M
    if bₘⁱ ≤ B_R, ∀m = 1, ..., M
      Kⁱ ← pulses({bₘⁱ}ₘ₌₁ᴹ, N)
      Vⁱ ← {Vₘⁱ}ₘ₌₁ᴹ where Vₘⁱ ≡ V (N, Kₘⁱ)
      Pⁱ ← P(N, Vⁱ)
      Eⁱ ← E (Pⁱ)
      S_K ← S_K ∪ {Kⁱ}
      S_E ← S_E ∪ {Eⁱ}
    end if
  end for
  return S_K, S_E
```

Quality and bitrate tracker 172 may track the performance of or more components of vector quantizer 108. For instance, quality and bitrate tracker 172 may observe the resulting quality and bitrate that the cooperative quality and bitrate scalable controller 170 and the cooperative PVQ system were able to accommodate in response to the requested target quality and/or bitrate values from the scalability controller 156 when serving network conditions/ requests. Quality and bitrate tracker 172 may compare the accommodated target bitrate and quality reached by the cooperative PVQ with those of the requested targets and track their changes and adaptations in real time. Quality and bitrate tracker 172 may provide the current state of the accommodated quality and rate to the scalability controller 156 so it can track and accommodate in real time, any changes in target values.

Figure 9A:
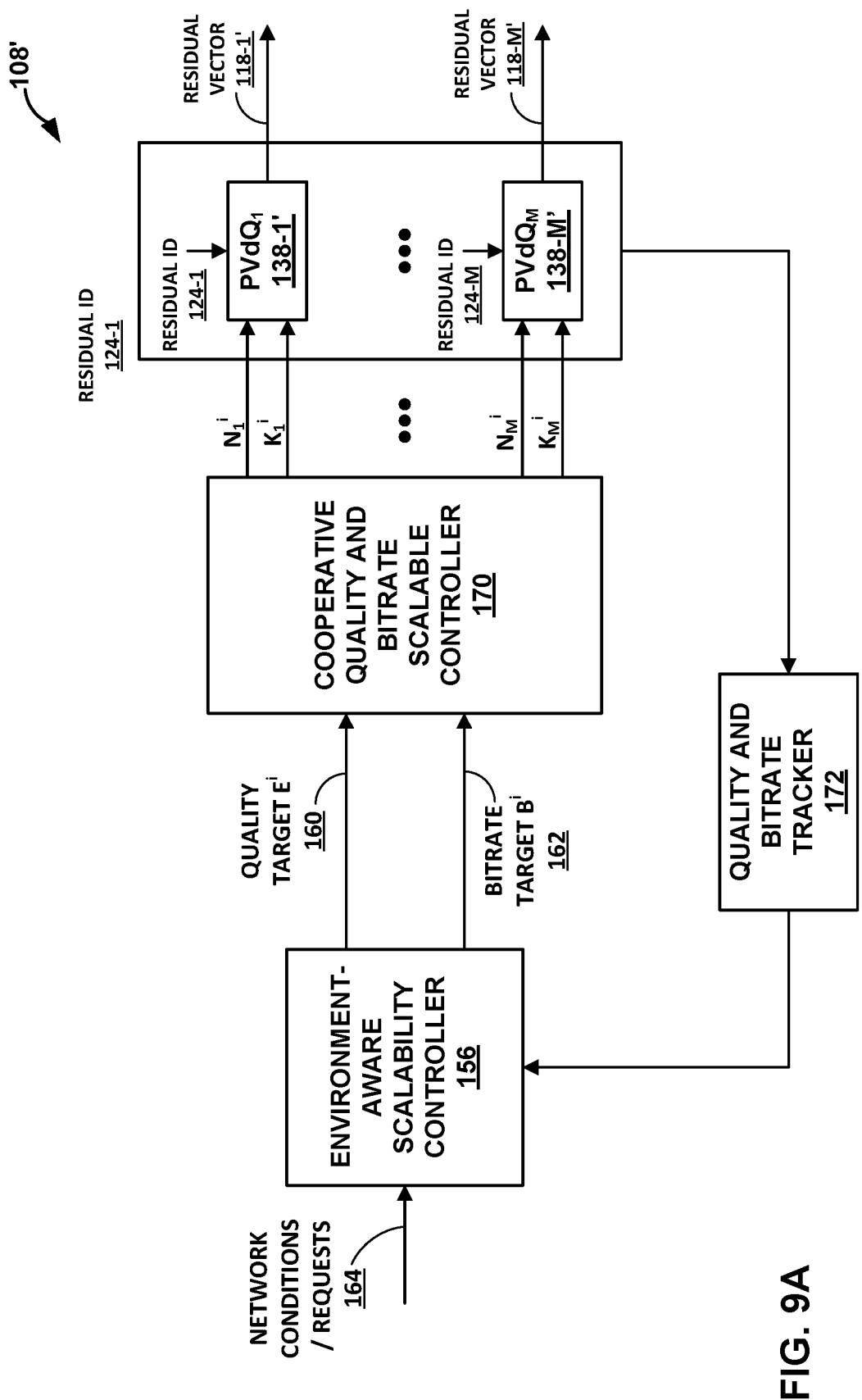
FIGS. 9A-9C are block diagrams illustrating example vector dequantizers configured to perform various aspects of the techniques described in this disclosure.
Figure 9B:
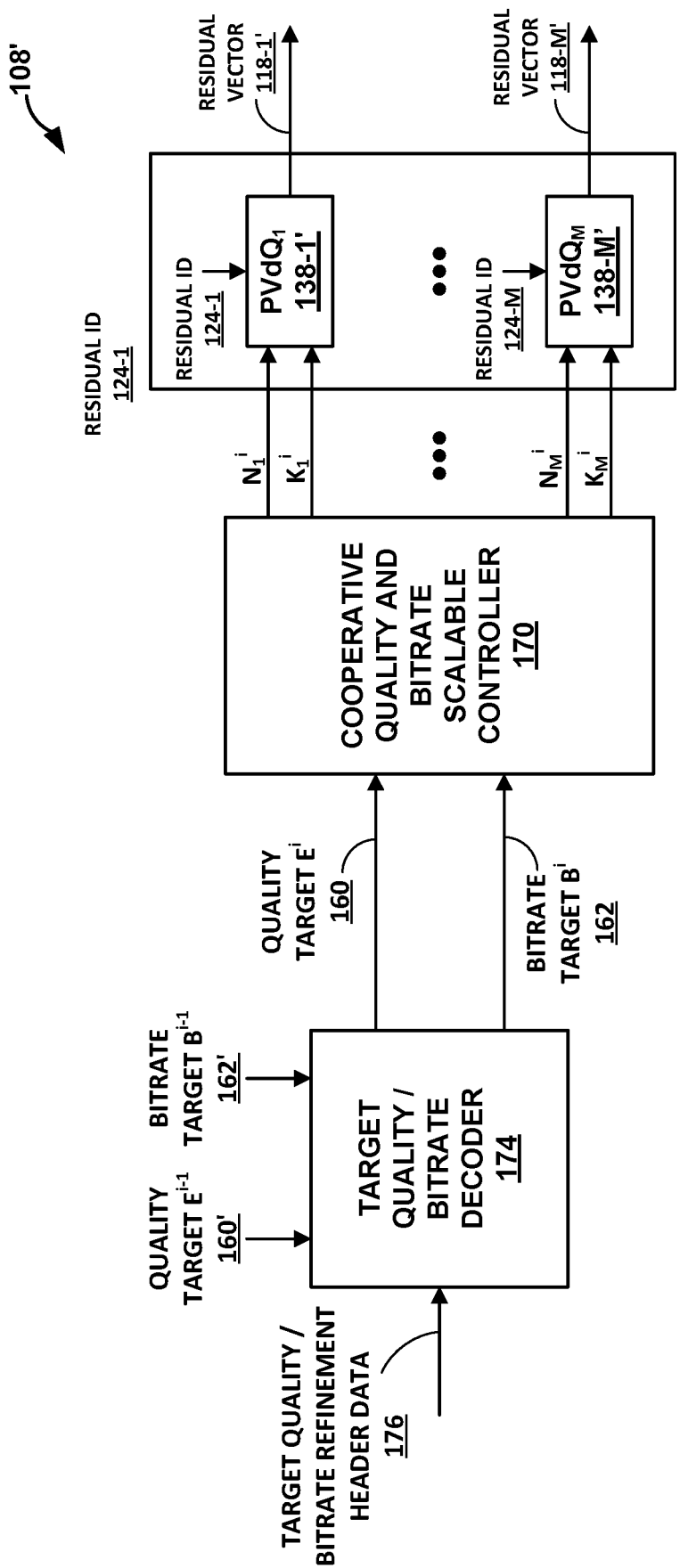
Figure 9C:
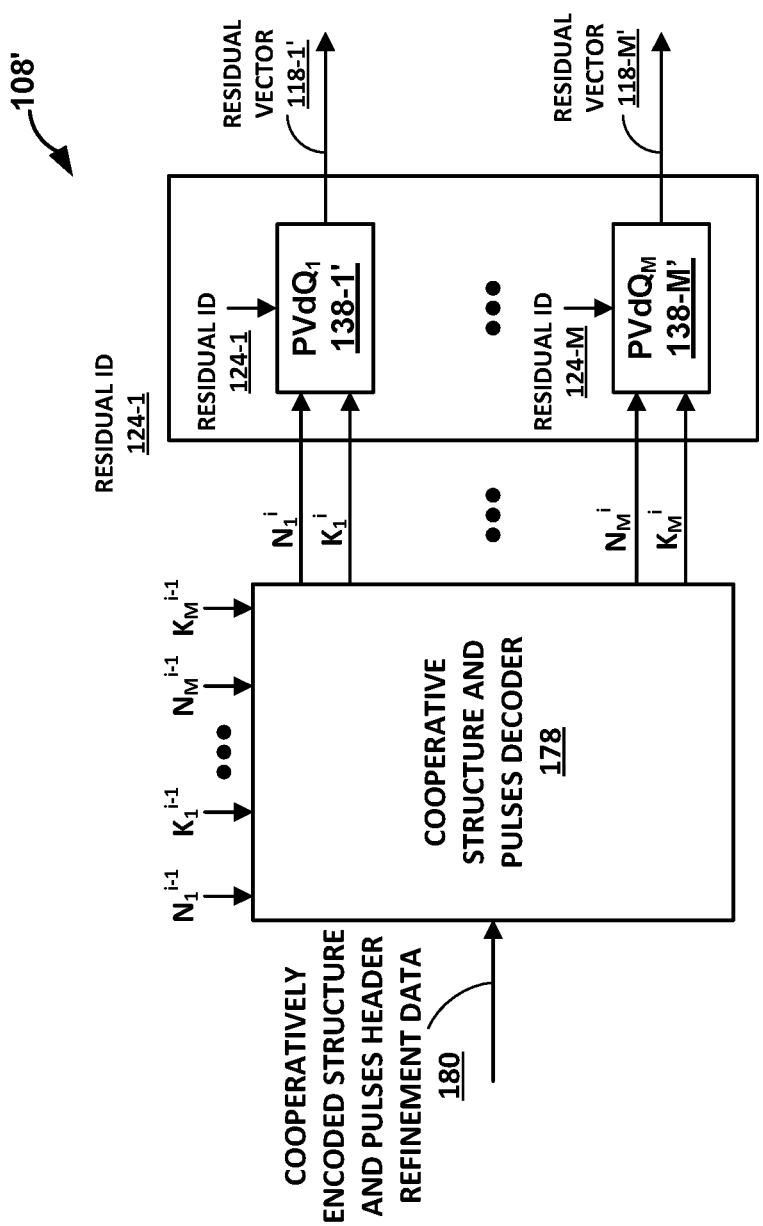

FIGS. 9A-9C are block diagrams illustrating example vector dequantizers 108' configured to perform various aspects of the techniques described in this disclosure. In particular, the vector dequantizer 108' may be configured to perform the cooperative pyramid vector quantization techniques of this disclosure.

In FIG. 9A, it is assumed that the audio decoder (e.g., audio decoder 44) has access to the network conditions and requests (e.g., network conditions/requests 164) directly. In such examples, the same processes of the quality and bitrate scalable controller can be used to characterize the PVuQ components cooperatively. Having this information, the PVuQ can reconstruct the residual vectors with the residual IDs from the bitstream decoder.

If the environment conditions and requests are directly accessible only to the audio encoder, or if the channel between the decoder and scalability controller is simply broken under some circumstances, the accompanying scalability refinement data may be communicated to the audio decoder. Two different realizations of such controller-independent decoding are shown in FIGS. 9B and 9C.

FIG. 9B illustrates a low bit overhead technique and FIG. 9C illustrates a low complexity technique. Both techniques enable audio decoding independent from the scalability controller. In the low bit overhead technique, the audio decoder receives a target quality and/or a target bitrate and determines the structure and pulse configuration based on the received target quality and/or the target bitrate. For instance, as shown in FIG. 9B, the audio decoder receives target quality/bitrate refinement header data 176 and includes a target quality/bitrate decoder 174 that determines a target quality 160 and/or a target bitrate 162 for a current frame based on the target quality/bitrate refinement header data 176. In some examples, such as where the target quality/bitrate refinement header data 176 specifies a delta between the target quality/bitrate, target quality/bitrate decoder 174 may determine the target quality 160 and/or the target bitrate 162 for the current frame i based on the target quality/bitrate refinement header data 176 and the target quality 160 and/or the target bitrate 162 for the previous frame i−1.

In the low complexity technique, the audio decoder may receive an express representation of the structure and pulses to be used when decoding the audio data. For instance, as shown in FIG. 9C, the audio decoder receives cooperatively encoded structure and pulses header refinement data 180 (e.g., one or more syntax elements that indicate a subband pulse allocation selected by an encoder) and includes a cooperative structure and pulses decoder 178 that determines the structure and pulse configuration for a current frame based on the received encoded structure and pulses header refinement data 180. In some examples, the cooperative structure and pulses decoder 178 may determine the structure and pulse configuration for the current frame i (e.g., $N_1^i \ldots N_M^i$) based on the received encoded structure and pulses header refinement data 180 and the structure and pulse configuration for a previous frame i−1 (e.g., $N_1^{i-1} \ldots N_M^{i-1}$).

The low bit overhead technique may be suitable where compression efficiency is of higher importance than decoding complexity. The low complexity technique, on the other hand, receives the cooperatively-encoded structure and pulses refinement data instead of the target quality and bitrate refinements. Therefore, the low complexity version may eliminate the need for cooperative iterations processes on the decoder side and reduce the complexity.

Figure 10:
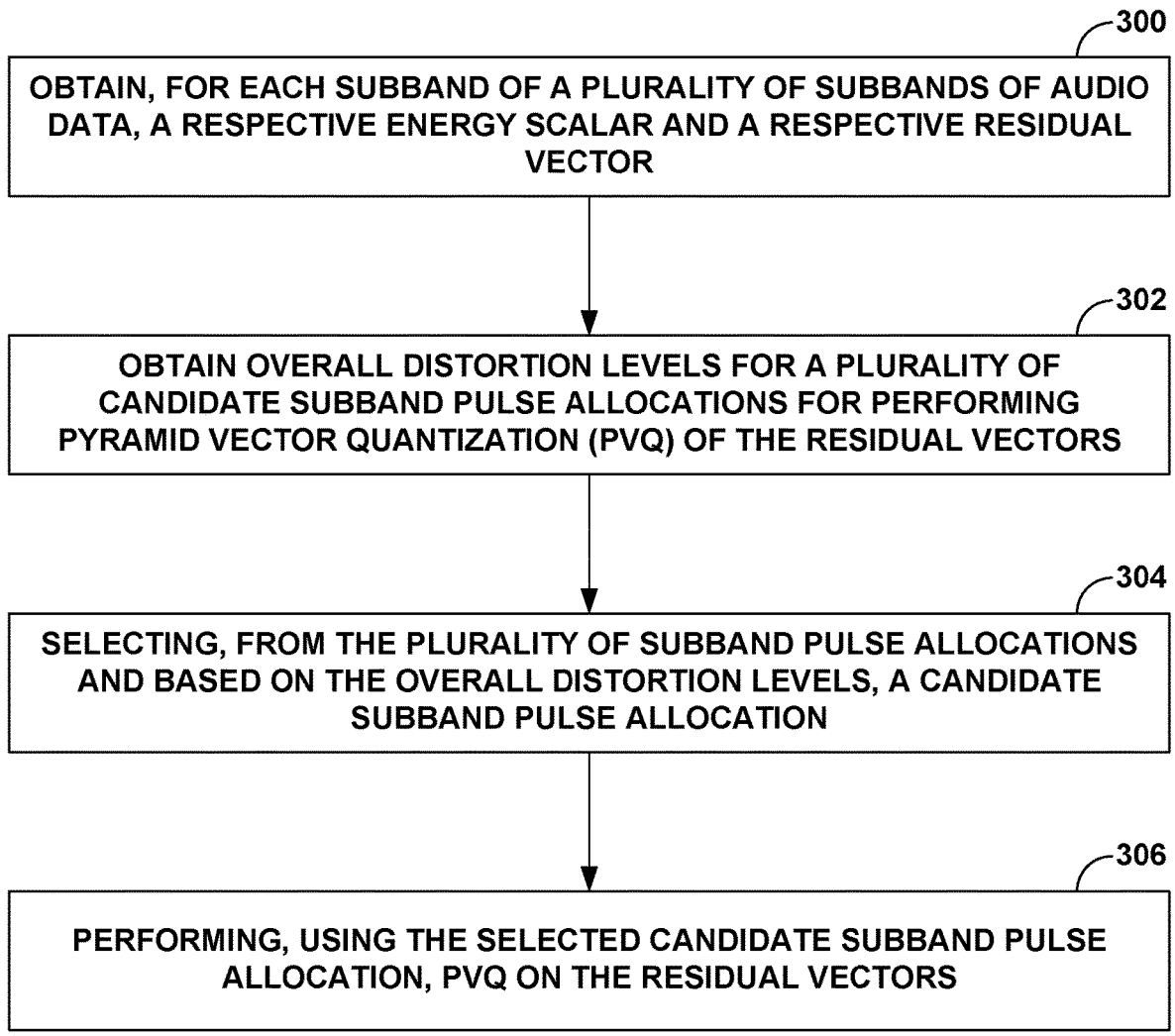
FIG. 10 is a flowchart illustrating example operation of the source device of FIG. 1 in performing various aspects of the techniques described in this disclosure.

FIG. 10 is a flowchart illustrating example operation of the source device 12 of FIG. 1 in performing various aspects of the techniques described in this disclosure. As shown in the example of FIG. 10, the audio encoder 24 of the source device 12 may be configured to encode audio data using bitrate scalable optimization in accordance with the techniques of this disclosure.

The audio encoder 24 may be configured to obtain, for each subband of a plurality of subbands of audio data, a respective energy scalar and a respective residual vector (300). For instance, gain-shape analysis unit 104 of audio encoder 24 may generate, for each of subbands 114, a respective energy level 116 and a respective residual vector 118.

The audio encoder 24 may be further configured to obtain overall distortion levels for a plurality of candidate subband pulse allocations for performing pyramid vector quantization (PVQ) of the residual vectors (302) and select, from the plurality of subband pulse allocations and based on the overall distortion levels, a candidate subband pulse allocation (304). For instance, cooperative quality and bitrate scalable controller 170 may use an initial solution (i.e., allocation of pulses that uses less than or equal to a maximum number of bits available for encoding all of the residual vectors) as a seed to search for the best solution (i.e., the solution that has the lowest distortion without using more than the maximum number of bits available). For example, the CQBSC 170 may determine the overall distortion that would result from encoding residual vectors using the initial solution, perturb the distribution of pulses to obtain a new solution (i.e., change the distribution of pulses while keeping the total number of bits used, as close as possible, but less than or equal to, the maximum number of bits available), and determine the overall distortion that would result from encoding residual vectors using the new solution. The CQBSC 170 may continue to search for solutions until an end condition is met. Example end conditions include, but are not limited to, having evaluated a certain number of solutions (e.g., the audio encoder may stop after evaluating X solutions), and the distortion for an evaluated solution is less than a minimum distortion. In some examples, the CQBSC 170 may obtain the overall distortion levels and select the candidate subband pulse allocation in accordance with the psudocode for the quality scalable mode provided above.

The audio encoder 24 perform, using the selected candidate subband pulse allocation, PVQ on the residual vectors (306). For instance, pyramid vector quantizers 138-1-138-M may each perform mapping and enumeration based on the number of pulses allocated to each subband in the selected candidate subband pulse allocation. For example, pyramid vector quantizer 138-1 may perform mapping and enumeration to generate a residual ID 124-1 for residual vector 118-1 based on a number of pulses allocated to subband 1 in the selected candidate subband pulse allocation (i.e., $K_1^i$) and pyramid vector quantizer 138-M may perform mapping and enumeration to generate a residual ID 124-M for residual vector 118-M based on a number of pulses allocated to subband M in the selected candidate subband pulse allocation (i.e., $K_M^i$). In this way, the audio encoder 24 may perform cooperative pyramid vector quantization.

The audio encoder 24 may encode the results of the PVQ in an encoded audio bitstream that is transmitted to an audio decoder, such as the audio decoder 44 of sink device 14 of FIG. 1. For instance, the audio encoder 24 may encode each of residual IDs 124 in the encoded audio bitstream 31 which is transmitted to the sink device 14 over transmission channel 31. In some examples, the audio encoder 24 may further encode, in the audio bitstream, one or more syntax elements that represent the selected candidate subband pulse allocation (e.g., one or more syntax elements that indicate the number of pulses or bits allocated to each subband).

The audio encoder 24 may periodically update the allocations. For instance, the CQBSC 170 may update the pulse allocations for different frames of audio data based on information received from environment-aware scalability controller 156. As one example, where the amount of available bandwidth decreases, CQBSC 170 may update the pulse allocations using a smaller $B_{max}$.

Figure 11:
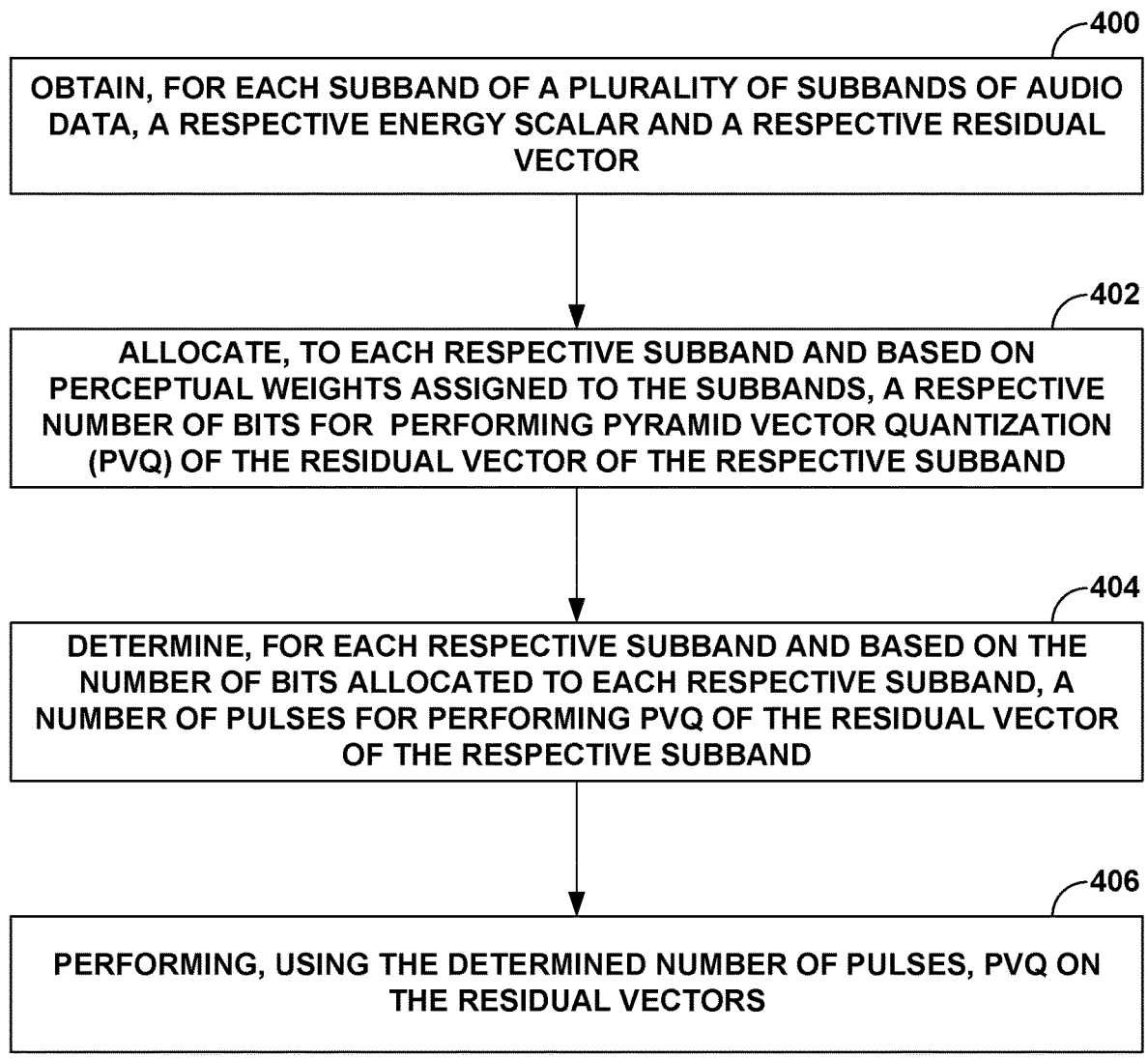
FIG. 11 is a flowchart illustrating example operation of the source device of FIG. 1 in performing various aspects of the techniques described in this disclosure.

FIG. 11 is a flowchart illustrating example operation of the source device 12 of FIG. 1 in performing various aspects of the techniques described in this disclosure. As shown in the example of FIG. 11, the audio encoder 24 of the source device 12 may be configured to encode audio data using quality scalable optimization in accordance with the techniques of this disclosure.

The audio encoder 24 may be configured to obtain, for each subband of a plurality of subbands of audio data, a respective energy scalar and a respective residual vector (400). For instance, gain-shape analysis unit 104 of audio encoder 24 may generate, for each of subbands 114, a respective energy level 116 and a respective residual vector 118.

The audio encoder 24 may be configured to allocated, to each respective subband and based on perceptual weights assigned to the subbands, a respective number of bits for performing pyramid vector quantization (PVQ) of the residual vector of the respective subband (402). For instance, the cooperative quality and bitrate scalable controller 170 may obtain, for each subband, a weight that represents the perceptual importance of the subband. The weights may be normalized such that the total value of the weights for all subbands equals one. The CQBSC 170 may obtain (e.g., from environment aware scalability controller 156) a bit budget or total number of bits available for encoding the residual vectors. The CQBSC 170 may then allocate bits to the subbands based on their respective weights. For instance, the CQBSC 170 may allocate bits amongst the subbands in accordance with the following equation where B is the total number of bits, $b_m$ is the number of bits allocated to subband m, and $p_m$ is the perceptual weight of subband m.

$$b_m = B \cdot p_m$$

To illustrate, if the total bit budget B is 100 bits and there are four subbands A, B, C, and D with weights $p_A=0.1$, $p_B=0.3$, $p_C=0.5$, and $p_D=0.1$, the audio encoder 24 may allocate 10 bits to subband A, 30 bits to subband B, 50 bits to subband C, and 10 bits to subband D.

The audio encoder 24 may be configured to determine, for each respective subband and based on the number of bits allocated to the respective subband, a number of pulses for performing PVQ of the residual vector of the respective subband (404). For instance, the CQBSC 170 may determine the maximum number of pulses that can be used for each subband without exceeding the number of bits allocated to the subband.

The audio encoder 24 perform, using the determined number of pulses, PVQ on the residual vectors (406). For instance, pyramid vector quantizers 138-1-138-M may each perform mapping and enumeration based on the number of pulses allocated to each subband in the selected candidate subband pulse allocation. For example, pyramid vector quantizer 138-1 may perform mapping and enumeration to generate a residual ID 124-1 for residual vector 118-1 based on a number of pulses allocated to subband 1 in the selected candidate subband pulse allocation (i.e., $K_1^i$) and pyramid vector quantizer 138-M may perform mapping and enumeration to generate a residual ID 124-M for residual vector 118-M based on a number of pulses allocated to subband M in the selected candidate subband pulse allocation (i.e., $K_M^i$). In this way, the audio encoder 24 may perform cooperative pyramid vector quantization.

The audio encoder 24 may encode the results of the PVQ in an encoded audio bitstream that is transmitted to an audio decoder, such as the audio decoder 44 of sink device 14 of FIG. 1. For instance, the audio encoder 24 may encode each of residual IDs 124 in the encoded audio bitstream 31 which is transmitted to the sink device 14 over transmission channel 31. In some examples, the audio encoder 24 may further encode, in the audio bitstream, one or more syntax elements that represent the selected candidate subband pulse allocation (e.g., one or more syntax elements that indicate the number of pulses or bits allocated to each subband).

The audio encoder 24 may periodically update the allocations. For instance, the CQBSC 170 may update the pulse allocations for different frames of audio data based on information received from environment-aware scalability controller 156. As one example, where the amount of available bandwidth decreases, CQBSC 170 may update the pulse allocations using a smaller bit budget or $B_{max}$.

Figure 12:
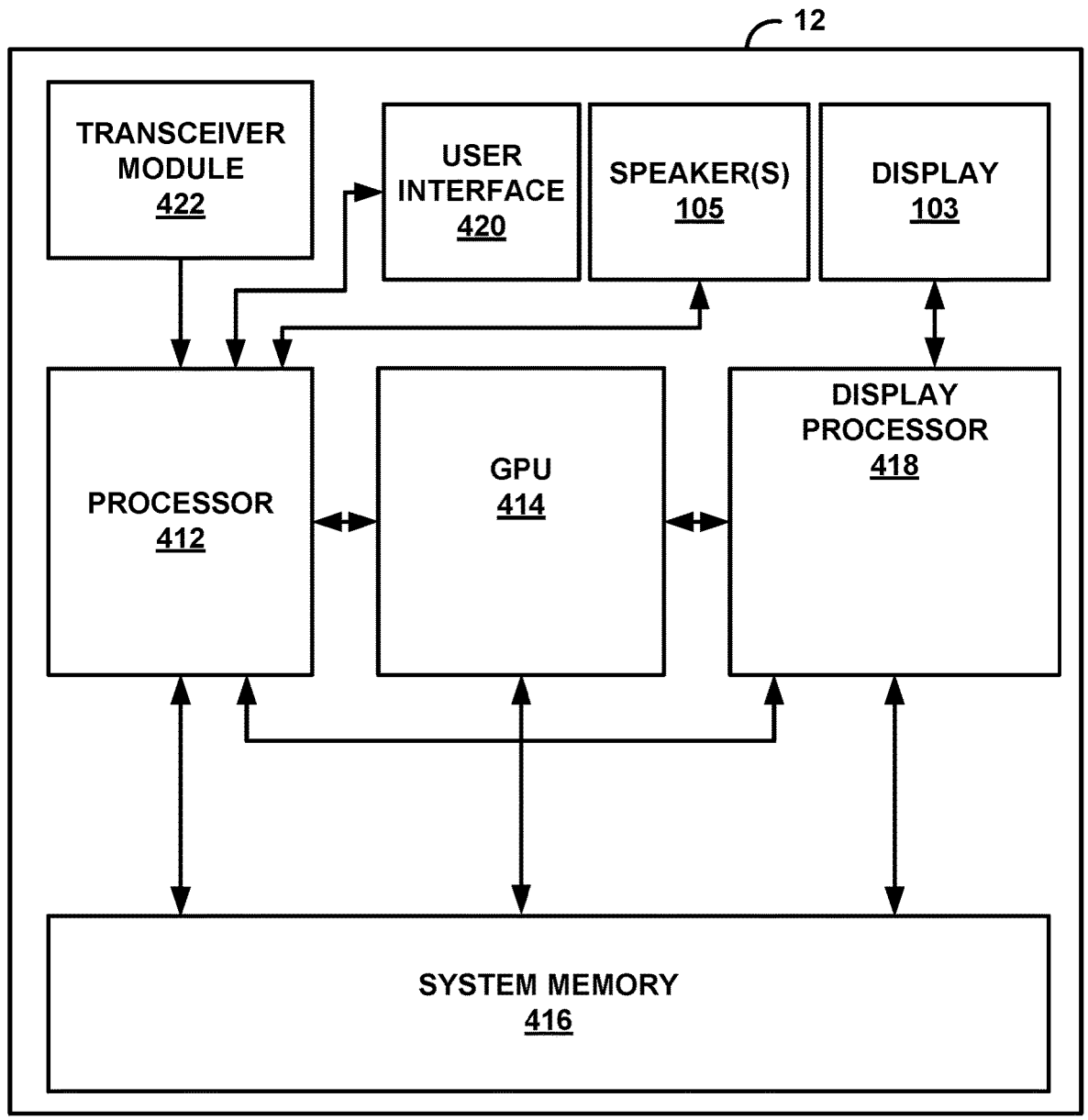
FIG. 12 is a block diagram illustrating example components of the source device shown in the example of FIG. 1.

FIG. 12 is a block diagram illustrating example components of the source device 12 shown in the example of FIG. 1. In the example of FIG. 12, the source device 12 includes a processor 412, a graphics processing unit (GPU) 414, system memory 416, a display processor 418, one or more integrated speakers 105, a display 103, a user interface 420, and a transceiver module 422. In examples where the source device 12 is a mobile device, the display processor 418 is a mobile display processor (MDP). In examples, such as examples where the source device 12 is a mobile device, the processor 412, the GPU 414, and the display processor 418 may be formed as an integrated circuit (IC).

For example, the IC may be considered as a processing chip within a chip package and may be a system-on-chip (SoC). In some examples, two of the processors 412, the GPU 414, and the display processor 418 may be housed together in the same IC and the other in a different integrated circuit (i.e., different chip packages) or all three may be housed in different ICs or on the same IC. However, it may be possible that the processor 412, the GPU 414, and the display processor 418 are all housed in different integrated circuits in examples where the source device 12 is a mobile device.

Examples of the processor 412, the GPU 414, and the display processor 418 include, but are not limited to, one or more digital signal processors (DSPs), general purpose microprocessors, application specific integrated circuits (ASICs), field programmable logic arrays (FPGAs), or other equivalent integrated or discrete logic circuitry. The processor 412 may be the central processing unit (CPU) of the source device 12. In some examples, the GPU 414 may be specialized hardware that includes integrated and/or discrete logic circuitry that provides the GPU 414 with massive parallel processing capabilities suitable for graphics processing. In some instances, GPU 414 may also include general purpose processing capabilities, and may be referred to as a general-purpose GPU (GPGPU) when implementing general purpose processing tasks (i.e., non-graphics related tasks). The display processor 418 may also be specialized integrated circuit hardware that is designed to retrieve image content from the system memory 416, compose the image content into an image frame, and output the image frame to the display 103.

The processor 412 may execute various types of the applications 20. Examples of the applications 20 include web browsers, e-mail applications, spreadsheets, video games, other applications that generate viewable objects for display, or any of the application types listed in more detail above. The system memory 416 may store instructions for execution of the applications 20. The execution of one of the applications 20 on the processor 412 causes the processor 412 to produce graphics data for image content that is to be displayed and the audio data 21 that is to be played (possibly via integrated speaker 105). The processor 412 may transmit graphics data of the image content to the GPU 414 for further processing based on and instructions or commands that the processor 412 transmits to the GPU 414.

The processor 412 may communicate with the GPU 414 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and the processor 412 and the GPU 414 may utilize any technique for communication.

The system memory 416 may be the memory for the source device 12. The system memory 416 may comprise one or more computer-readable storage media. Examples of the system memory 416 include, but are not limited to, a random-access memory (RAM), an electrically erasable programmable read-only memory (EEPROM), flash memory, or other medium that can be used to carry or store desired program code in the form of instructions and/or data structures and that can be accessed by a computer or a processor.

In some examples, the system memory 416 may include instructions that cause the processor 412, the GPU 414, and/or the display processor 418 to perform the functions ascribed in this disclosure to the processor 412, the GPU 414, and/or the display processor 418. Accordingly, the system memory 416 may be a computer-readable storage medium having instructions stored thereon that, when executed, cause one or more processors (e.g., the processor 412, the GPU 414, and/or the display processor 418) to perform various functions.

The system memory 416 may include a non-transitory storage medium. The term "non-transitory" indicates that the storage medium is not embodied in a carrier wave or a propagated signal. However, the term "non-transitory" should not be interpreted to mean that the system memory 416 is non-movable or that its contents are static. As one example, the system memory 416 may be removed from the source device 12 and moved to another device. As another example, memory, substantially similar to the system memory 416, may be inserted into the source device 12. In certain examples, a non-transitory storage medium may store data that can, over time, change (e.g., in RAM).

The user interface 420 may represent one or more hardware or virtual (meaning a combination of hardware and software) user interfaces by which a user may interface with the source device 12. The user interface 420 may include physical buttons, switches, toggles, lights or virtual versions thereof. The user interface 420 may also include physical or virtual keyboards, touch interfaces—such as a touchscreen, haptic feedback, and the like.

The processor 412 may include one or more hardware units (including so-called "processing cores") configured to perform all or some portion of the operations discussed above with respect to one or more of the mixing unit 22, the audio encoder 24, the wireless connection manager 26, and the wireless communication units 30. The transceiver module 422 may represent a unit configured to establish and maintain the wireless connection between the source device 12 and the sink device 14. The transceiver module 422 may represent one or more receivers and one or more transmitters capable of wireless communication in accordance with one or more wireless communication protocols. The transceiver module 422 may perform all or some portion of the operations of one or more of the wireless connection manager 26 and the wireless communication units 30.

Figure 13:
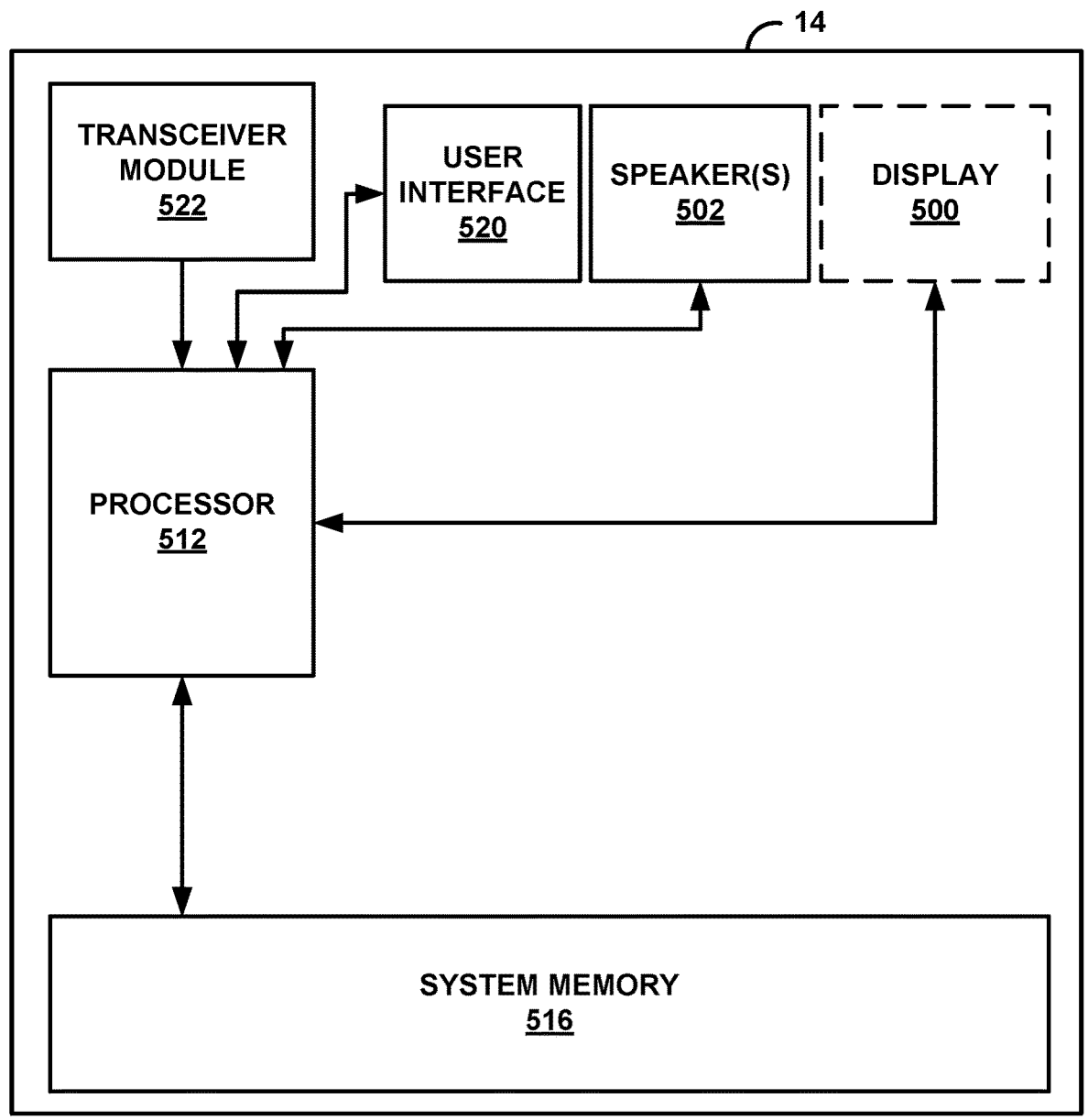
FIG. 13 is a block diagram illustrating exemplary components of the sink device shown in the example of FIG. 1.

FIG. 13 is a block diagram illustrating exemplary components of the sink device 14 shown in the example of FIG. 1. Although the sink device 14 may include components similar to that of the source device 12 discussed above in more detail with respect to the example of FIG. 12, the sink device 14 may, in certain instances, include only a subset of the components discussed above with respect to the source device 12.

In the example of FIG. 13, the sink device 14 includes one or more speakers 502, a processor 512, a system memory 516, a user interface 520, and a transceiver module 522. The processor 512 may be similar or substantially similar to the processor 412. In some instances, the processor 512 may differ from the processor 412 in terms of total processing capacity or may be tailored for low power consumption. The system memory 516 may be similar or substantially similar to the system memory 416. The speakers 502, the user interface 520, and the transceiver module 522 may be similar to or substantially similar to the respective speakers 105, user interface 420, and transceiver module 422. The sink device 14 may also optionally include a display 500, although the display 500 may represent a low power, low resolution (potentially a black and white LED) display by which to communicate limited information, which may be driven directly by the processor 512.

The processor 512 may include one or more hardware units (including so-called "processing cores") configured to perform all or some portion of the operations discussed above with respect to one or more of the wireless connection manager 40, the wireless communication units 42, and the audio decoder 44. The transceiver module 522 may represent a unit configured to establish and maintain the wireless connection between the source device 12 and the sink device 14. The transceiver module 522 may represent one or more receivers and one or more transmitters capable of wireless communication in accordance with one or more wireless communication protocols. The transceiver module 522 may perform all or some portion of the operations of one or more of the wireless connection manager 40 and the wireless communication units 28.

The foregoing techniques may be performed with respect to any number of different contexts and audio ecosystems. A number of example contexts are described below, although the techniques should be limited to the example contexts. One example audio ecosystem may include audio content, movie studios, music studios, gaming audio studios, channel-based audio content, coding engines, game audio stems, game audio coding/rendering engines, and delivery systems.

The movie studios, the music studios, and the gaming audio studios may receive audio content. In some examples, the audio content may represent the output of an acquisition. The movie studios may output channel-based audio content (e.g., in 2.0, 5.1, and 7.1) such as by using a digital audio workstation (DAW). The music studios may output channel-based audio content (e.g., in 2.0, and 5.1) such as by using a DAW. In either case, the coding engines may receive and encode the channel-based audio content based one or more codecs (e.g., AAC, AC3, Dolby True HD, Dolby Digital Plus, and DTS Master Audio) for output by the delivery systems. The gaming audio studios may output one or more game audio stems, such as by using a DAW. The game audio coding/rendering engines may code and or render the audio stems into channel-based audio content for output by the delivery systems. Another example context in which the techniques may be performed comprises an audio ecosystem that may include broadcast recording audio objects, professional audio systems, consumer on-device capture, high-order ambisonics (HOA) audio format, on-device rendering, consumer audio, TV, and accessories, and car audio systems.

The broadcast recording audio objects, the professional audio systems, and the consumer on-device capture may all code their output using HOA audio format. In this way, the audio content may be coded using the HOA audio format into a single representation that may be played back using the on-device rendering, the consumer audio, TV, and accessories, and the car audio systems. In other words, the single representation of the audio content may be played back at a generic audio playback system (i.e., as opposed to requiring a particular configuration such as 5.1, 7.1, etc.), such as audio playback system 16.

Other examples of context in which the techniques may be performed include an audio ecosystem that may include acquisition elements, and playback elements. The acquisition elements may include wired and/or wireless acquisition devices (e.g., microphones), on-device surround sound capture, and mobile devices (e.g., smartphones and tablets). In some examples, wired and/or wireless acquisition devices may be coupled to mobile device via wired and/or wireless communication channel(s).

In accordance with one or more techniques of this disclosure, the mobile device may be used to acquire a soundfield. For instance, the mobile device may acquire a soundfield via the wired and/or wireless acquisition devices and/or the on-device surround sound capture (e.g., a plurality of microphones integrated into the mobile device). The mobile device may then code the acquired soundfield into various representations for playback by one or more of the playback elements. For instance, a user of the mobile device may record (acquire a soundfield of) a live event (e.g., a meeting, a conference, a play, a concert, etc.), and code the recording into various representation, including higher order ambisonic HOA representations.

The mobile device may also utilize one or more of the playback elements to playback the coded soundfield. For instance, the mobile device may decode the coded soundfield and output a signal to one or more of the playback elements that causes the one or more of the playback elements to recreate the soundfield. As one example, the mobile device may utilize the wireless and/or wireless communication channels to output the signal to one or more speakers (e.g., speaker arrays, sound bars, etc.). As another example, the mobile device may utilize docking solutions to output the signal to one or more docking stations and/or one or more docked speakers (e.g., sound systems in smart cars and/or homes). As another example, the mobile device may utilize headphone rendering to output the signal to a headset or headphones, e.g., to create realistic binaural sound.

In some examples, a particular mobile device may both acquire a soundfield and playback the same soundfield at a later time. In some examples, the mobile device may acquire a soundfield, encode the soundfield, and transmit the encoded soundfield to one or more other devices (e.g., other mobile devices and/or other non-mobile devices) for playback.

Yet another context in which the techniques may be performed includes an audio ecosystem that may include audio content, game studios, coded audio content, rendering engines, and delivery systems. In some examples, the game studios may include one or more DAWs which may support editing of audio signals. For instance, the one or more DAWs may include audio plugins and/or tools which may be configured to operate with (e.g., work with) one or more game audio systems. In some examples, the game studios may output new stem formats that support audio format. In any case, the game studios may output coded audio content to the rendering engines which may render a soundfield for playback by the delivery systems.

The mobile device may also, in some instances, include a plurality of microphones that are collectively configured to record a soundfield, including 3D soundfields. In other words, the plurality of microphone may have X, Y, Z diversity. In some examples, the mobile device may include a microphone which may be rotated to provide X, Y, Z diversity with respect to one or more other microphones of the mobile device.

A ruggedized video capture device may further be configured to record a soundfield. In some examples, the ruggedized video capture device may be attached to a helmet of a user engaged in an activity. For instance, the ruggedized video capture device may be attached to a helmet of a user whitewater rafting. In this way, the ruggedized video capture device may capture a soundfield that represents the action all around the user (e.g., water crashing behind the user, another rafter speaking in front of the user, etc.).

The techniques may also be performed with respect to an accessory enhanced mobile device, which may be configured to record a soundfield, including a 3D soundfield. In some examples, the mobile device may be similar to the mobile devices discussed above, with the addition of one or more accessories. For instance, a microphone, including an Eigen microphone, may be attached to the above noted mobile device to form an accessory enhanced mobile device. In this way, the accessory enhanced mobile device may capture a higher quality version of the soundfield than just using sound capture components integral to the accessory enhanced mobile device.

Example audio playback devices that may perform various aspects of the techniques described in this disclosure are further discussed below. In accordance with one or more techniques of this disclosure, speakers and/or sound bars may be arranged in any arbitrary configuration while still playing back a soundfield, including a 3D soundfield. Moreover, in some examples, headphone playback devices may be coupled to a decoder via either a wired or a wireless connection. In accordance with one or more techniques of this disclosure, a single generic representation of a soundfield may be utilized to render the soundfield on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front loudspeakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a soundfield may be utilized to render the soundfield on any of the foregoing playback environments. Additionally, the techniques of this disclosure enable a rendered to render a soundfield from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a render to compensate with the other 6 speakers such that playback may be achieved on a 6.1 speaker playback environment.

Moreover, a user may watch a sports game while wearing headphones. In accordance with one or more techniques of this disclosure, the soundfield, including 3D soundfields, of the sports game may be acquired (e.g., one or more microphones and/or Eigen microphones may be placed in and/or around the baseball stadium). HOA coefficients corresponding to the 3D soundfield may be obtained and transmitted to a decoder, the decoder may reconstruct the 3D soundfield based on the HOA coefficients and output the reconstructed 3D soundfield to a renderer, the renderer may obtain an indication as to the type of playback environment (e.g., headphones), and render the reconstructed 3D soundfield into signals that cause the headphones to output a representation of the 3D soundfield of the sports game.

The following examples may illustrate one or more aspects of the disclosure:

Example 1

An apparatus configured to decode audio data, the apparatus comprising: a memory configured to store the audio data; and one or more processors in communication with the memory, the one or more processors configured to: obtain, for each of a plurality of subbands of audio data, a respective energy scalar and a respective residual identifier; allocate, to each respective subband and based on perceptual weights assigned to the subbands, a respective number of bits for performing pyramid vector dequantization (PVdQ) of the residual vector of the respective subband; determine, for each respective subband and based on the number of bits allocated to each respective subband, a number of pulses for performing PVdQ of the residual vector of the respective subband; and perform, using the determined numbers of pulses, PVdQ on the residual vectors to reconstruct a residual vector for each subband.

Example 2

The apparatus of example 1, wherein, to allocate the respective number of bits to each respective subband, the one or more processors are configured to: allocate, from a bit budget for encoding the residual vectors, the respective number of bits to each respective subband based on perceptual weights assigned to the subbands.

Example 3

The apparatus of example 2, wherein the residual vectors are for a first frame and the bit budget is a first bit budget, and wherein the one or more processors are further configured to: allocate, from a second bit budget for encoding residual vectors for a second frame and based on the perceptual weights assigned to the subbands, bits for performing PVQ of the residual vectors for the second frame.

Example 4

The apparatus of example 1, wherein, to receive the residual identifiers, the one or more processors are configured to: decode, from an encoded audio bitstream, the residual identifiers.

Example 5

The apparatus of example 4, further comprising: a receiver configured to receive the encoded audio bitstream over a personal area network (PAN) using a PAN communication protocol.

Example 6

The apparatus of example 5, wherein the PAN communication protocol is a Bluetooth communication protocol.

Example 7

The apparatus of example 1, further comprising: one or more loudspeakers configured to playback the reconstructed audio data.

Example 8

The apparatus of example 7, wherein the one or more loudspeakers are included in headphones.

Example 9

A method comprising: obtaining, by an audio decoder and for each of a plurality of subbands of audio data, a respective energy scalar and a respective residual identifier; allocating, by the audio decoder and to each respective subband and based on perceptual weights assigned to the subbands, a respective number of bits for performing pyramid vector dequantization (PVdQ) of the residual vector of the respective subband; determining, by the audio decoder and for each respective subband and based on the number of bits allocated to each respective subband, a number of pulses for performing PVdQ of the residual vector of the respective subband; and performing, by the audio decoder and using the determined numbers of pulses, PVdQ on the residual vectors to reconstruct a residual vector for each subband.

Example 10

The method of example 9, wherein allocating the respective number of bits to each respective subband comprises: allocating, from a bit budget for encoding the residual vectors, the respective number of bits to each respective subband based on perceptual weights assigned to the subbands.

Example 11

The method of example 10, wherein the residual vectors are for a first frame and the bit budget is a first bit budget, the method further comprising: allocating, from a second bit budget for encoding residual vectors for a second frame and based on the perceptual weights assigned to the subbands, bits for performing PVQ of the residual vectors for the second frame.

Example 12

The method of example 9, wherein obtaining the residual identifiers comprises: decoding, from an encoded audio bitstream, the residual identifiers.

Example 13

The method of example 12, further comprising: receiving the encoded audio bitstream over a personal area network (PAN) using a PAN communication protocol.

Example 14

The method of example 13, wherein the PAN communication protocol is a Bluetooth communication protocol.

Example 15

An apparatus configured to encode audio data, the apparatus comprising: a memory configured to store the audio data; and one or more processors in communication with the memory, the one or more processors configured to: separate audio data into a plurality of subbands; generate, for each subband, a respective energy scalar and a respective residual vector; allocate, to each respective subband and based on perceptual weights assigned to the subbands, a respective number of bits for performing pyramid vector quantization (PVQ) of the residual vector of the respective subband; determine, for each respective subband and based on the number of bits allocated to each respective subband, a number of pulses for performing PVQ of the residual vector of the respective subband; and perform, using the determined numbers of pulses, PVQ on the residual vectors.

Example 16

The apparatus of example 15, wherein, to allocate the respective number of bits to each respective subband, the one or more processors are configured to: allocate, from a bit budget for encoding the residual vectors, the respective number of bits to each respective subband based on perceptual weights assigned to the subbands.

Example 17

The apparatus of example 16, wherein the residual vectors are for a first frame and the bit budget is a first bit budget, and wherein the one or more processors are further configured to: allocate, from a second bit budget for encoding residual vectors for a second frame and based on the perceptual weights assigned to the subbands, bits for performing PVQ of the residual vectors for the second frame.

Example 18

The apparatus of example 15, wherein the one or more processors are further configured to: encode, in an encoded audio bitstream, the residual identifiers.

Example 19

The apparatus of example 18, further comprising: a transmitter configured to transmit the encoded audio bitstream over a personal area network (PAN) using a PAN communication protocol.

Example 20

The apparatus of example 21, wherein the PAN communication protocol is a Bluetooth communication protocol.

Example 21

The apparatus of example 15, further comprising a microphone, wherein the one or more processors are configured to obtain the audio data via the microphone.

Example 22

A method comprising: separating, by an audio encoder, audio data into a plurality of subbands; generating, by the audio encoder and for each subband, a respective energy scalar and a respective residual vector; allocating, by the audio encoder and to each respective subband and based on perceptual weights assigned to the subbands, a respective number of bits for performing pyramid vector quantization (PVQ) of the residual vector of the respective subband; determining, by the audio encoder and for each respective subband and based on the number of bits allocated to each respective subband, a number of pulses for performing PVQ of the residual vector of the respective subband; and performing, by the audio encoder and using the determined numbers of pulses, PVQ on the residual vectors.

Example 23

The method of example 22, wherein allocating the respective number of bits to each respective subband further comprises: allocating, from a bit budget for encoding the residual vectors, the respective number of bits to each respective subband based on perceptual weights assigned to the subbands.

Example 24

The method of example 23, wherein the residual vectors are for a first frame and the bit budget is a first bit budget, the method further comprising: allocating, from a second bit budget for encoding residual vectors for a second frame and based on the perceptual weights assigned to the subbands, bits for performing PVQ of the residual vectors for the second frame.

Example 25

The method of example 22, further comprising: encoding, in an encoded audio bitstream, the residual identifiers.

Example 26

The method of example 25, further comprising: encoding, in the encoded audio bitstream, one or more syntax elements that indicate the number of bits allocated to each respective subband.

Example 27

The method of example 25, further comprising: transmitting the encoded audio bitstream over a personal area network (PAN) using a PAN communication protocol.

Example 28

The method of example 27, wherein the PAN communication protocol is a Bluetooth communication protocol.

Example 29

A method comprising any combination of the methods of examples 9-14 and/or 22-28.

Example 30

An apparatus configured to perform the method of any combination of examples 9-14 and/or 22-28

In each of the various instances described above, it should be understood that the source device 12 may perform a method or otherwise comprise means to perform each step of the method for which the source device 12 is described above as performing. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the source device 12 has been configured to perform.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media. Data storage media may be any available media that can be accessed by one or more computers or one or more processors to retrieve instructions, code and/or data structures for implementation of the techniques described in this disclosure. A computer program product may include a computer-readable medium.

Likewise, in each of the various instances described above, it should be understood that the sink device 14 may perform a method or otherwise comprise means to perform each step of the method for which the sink device 14 is configured to perform. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the sink device 14 has been configured to perform.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the techniques have been described. These and other aspects of the techniques are within the scope of the following claims.

What is claimed is:

1. An apparatus configured to decode audio data, the apparatus comprising:
   a memory configured to store the audio data; and
   one or more processors in communication with the memory, the one or more processors configured to:
      obtain, for each of a plurality of subbands of audio data, a respective energy scalar and a respective residual identifier;
      determine overall distortion levels for a plurality of candidate subband pulse allocations for performing pyramid vector dequantization (PVdQ) of the residual identifiers;
      select, from the plurality of subband pulse allocations and based on the overall distortion levels, a candidate subband pulse allocation; and perform, using the candidate subband pulse allocation, PVdQ on the residual identifiers to reconstruct a residual vector for each subband.

2. The apparatus of claim 1, wherein, to determine the overall distortion levels, the one or more processors are configured to:
determine an overall distortion level for an initial candidate subband pulse allocation of the plurality of candidate subband pulse allocations;
modify the allocation of pulses in the initial candidate to generate a next candidate subband pulse allocation of the plurality of candidate subband pulse allocations such that a number of bits used by the next candidate subband pulse allocation is less than a maximum number of bits; and
determine an overall distortion level for the next candidate subband pulse allocation.

3. The apparatus of claim 2, wherein the maximum number of bits is a first maximum number of bits, to determine the overall distortion levels and select the candidate subband pulse allocation, the one or more processors are configured to determine the overall distortion levels and select the candidate subband pulse allocation for the first frame, and the one or more processors are further configured to:
determine overall distortion levels for a plurality of candidate subband pulse allocations for performing PVdQ of residual identifiers for a second frame by at least:
determining an overall distortion level for an initial candidate subband pulse allocation of the plurality of candidate subband pulse allocations for the second frame;
modifying the allocation of pulses in the initial candidate to generate a next candidate subband pulse allocation of the plurality of candidate subband pulse allocations such that a number of bits used by the next candidate subband pulse allocation is less than a second maximum number of bits; and
determining an overall distortion level for the next candidate subband pulse allocation; and
select, from the plurality of subband pulse allocations for the second frame and based on the overall distortion levels for the second frame, a candidate subband pulse allocation for performing PVdQ of residual identifiers for the second frame.

4. The apparatus of claim 1, wherein, to receive the residual identifiers, the one or more processors are configured to:
decode, from an encoded audio bitstream, the residual identifiers.

5. The apparatus of claim 4, further comprising:
a receiver configured to receive the encoded audio bitstream over a personal area network (PAN) using a PAN communication protocol.

6. The apparatus of claim 5, wherein the PAN communication protocol is a Bluetooth communication protocol.

7. The apparatus of claim 1, further comprising:
one or more loudspeakers configured to playback the reconstructed audio data.

8. The apparatus of claim 7, wherein the one or more loudspeakers are included in headphones.

9. The apparatus of claim 1, wherein the one or more processors comprise:
a bitstream decoder configured to obtain, for each of the plurality of subbands of audio data, the respective encoded energy scalar and the respective residual identifier;
a cooperative quality and bitrate scalable controller configured to:
determine the overall distortion levels for the plurality of candidate subband pulse allocations for performing PVdQ of the residual identifiers; and
select, from the plurality of subband pulse allocations and based on the overall distortion levels, the candidate subband pulse allocation; and
one or more pyramid vector dequantizers configured to perform, using the candidate subband pulse allocation, PVdQ on the residual identifiers to reconstruct the residual vector for each subband.

10. A method comprising:
obtaining, for each of a plurality of subbands of audio data, a respective energy scalar and a respective residual identifier;
determining overall distortion levels for a plurality of candidate subband pulse allocations for performing pyramid vector dequantization (PVdQ) of the residual identifiers;
selecting, from the plurality of subband pulse allocations and based on the overall distortion levels, a candidate subband pulse allocation; and
performing, using the candidate subband pulse allocation, PVdQ on the residual identifiers to reconstruct a residual vector for each subband.

11. The method of claim 10, wherein determining the overall distortion levels comprises:
determining an overall distortion level for an initial candidate subband pulse allocation of the plurality of candidate subband pulse allocations;
modifying the allocation of pulses in the initial candidate to generate a next candidate subband pulse allocation of the plurality of candidate subband pulse allocations such that a number of bits used by the next candidate subband pulse allocation is less than a maximum number of bits; and
determining an overall distortion level for the next candidate subband pulse allocation.

12. The method of claim 11, wherein the maximum number of bits is a first maximum number of bits, determining the overall distortion levels and selecting the candidate subband pulse allocation comprises determining the overall distortion levels and selecting the candidate subband pulse allocation for the first frame, the method further comprising:
determining overall distortion levels for a plurality of candidate subband pulse allocations for performing PVdQ of residual identifiers for a second frame, wherein the determining comprises:
determining an overall distortion level for an initial candidate subband pulse allocation of the plurality of candidate subband pulse allocations for the second frame;
modifying the allocation of pulses in the initial candidate to generate a next candidate subband pulse allocation of the plurality of candidate subband pulse allocations such that a number of bits used by the next candidate subband pulse allocation is less than a second maximum number of bits; and
determining an overall distortion level for the next candidate subband pulse allocation; and
selecting, from the plurality of subband pulse allocations for the second frame and based on the overall distortion levels for the second frame, a candidate subband pulse allocation for performing PVdQ of residual identifiers for the second frame.

13. The method of claim 10, wherein obtaining the residual identifiers comprises:
decoding, from an encoded audio bitstream, the residual identifiers.

14. The method of claim 13, further comprising:
receiving the encoded audio bitstream over a personal area network (PAN) using a PAN communication protocol.

15. The method of claim 14, wherein the PAN communication protocol is a Bluetooth communication protocol.

16. An apparatus configured to encode audio data, the apparatus comprising:
a memory configured to store the audio data; and
one or more processors in communication with the memory, the one or more processors configured to:
separate audio data into a plurality of subbands;
generate, for each subband, a respective energy scalar and a respective residual vector;
determine overall distortion levels for a plurality of candidate subband pulse allocations for performing pyramid vector quantization (PVQ) of the residual vectors;
select, from the plurality of subband pulse allocations and based on the overall distortion levels, a candidate subband pulse allocation; and
perform, using the candidate subband pulse allocation, PVQ on the residual vectors to generate a residual identifier for each residual vector.

17. The apparatus of claim 16, wherein, to determine the overall distortion levels, the one or more processors are configured to:
determine an overall distortion level for an initial candidate subband pulse allocation of the plurality of candidate subband pulse allocations;
modify the allocation of pulses in the initial candidate to generate a next candidate subband pulse allocation of the plurality of candidate subband pulse allocations such that a number of bits used by the next candidate subband pulse allocation is less than a maximum number of bits; and
determine an overall distortion level for the next candidate subband pulse allocation.

18. The apparatus of claim 17, wherein the maximum number of bits is a first maximum number of bits, to determine the overall distortion levels and select the candidate subband pulse allocation, the one or more processors are configured to determine the overall distortion levels and select the candidate subband pulse allocation for the first frame, and the one or more processors are further configured to:
determine overall distortion levels for a plurality of candidate subband pulse allocations for performing PVQ of residual vectors for a second frame by at least:
determining an overall distortion level for an initial candidate subband pulse allocation of the plurality of candidate subband pulse allocations for the second frame;
modifying the allocation of pulses in the initial candidate to generate a next candidate subband pulse allocation of the plurality of candidate subband pulse allocations such that a number of bits used by the next candidate subband pulse allocation is less than a second maximum number of bits; and
determining an overall distortion level for the next candidate subband pulse allocation; and
select, from the plurality of subband pulse allocations for the second frame and based on the overall distortion levels for the second frame, a candidate subband pulse allocation for performing PVQ of residual vectors for the second frame.

19. The apparatus of claim 16, wherein the one or more processors are further configured to:
encode, in an encoded audio bitstream, the residual identifiers.

20. The apparatus of claim 19, wherein the one or more processors are further configured to:
encode, in the encoded audio bitstream, one or more syntax elements that indicate the selected candidate subband pulse allocation.

21. The apparatus of claim 19, further comprising:
a transmitter configured to transmit the encoded audio bitstream over a personal area network (PAN) using a PAN communication protocol.

22. The apparatus of claim 21, wherein the PAN communication protocol is a Bluetooth communication protocol.

23. The apparatus of claim 16, wherein the one or more processors comprise:
a subband filter configured to separate the audio data into the plurality of subbands;
a gain-shape analysis unit configured to generate, for each subband, the respective energy scalar and the respective residual vector;
a cooperative quality and bitrate scalable controller configured to:
determine the overall distortion levels for the plurality of candidate subband pulse allocations for performing PVQ of the residual vectors; and
select, from the plurality of subband pulse allocations and based on the overall distortion levels, the candidate subband pulse allocation; and
one or more pyramid vector quantizers configured to perform, using the candidate subband pulse allocation, PVQ on the residual vectors to generate the residual identifier for each residual vector.

24. A method comprising:
separating audio data into a plurality of subbands;
generating, for each subband, a respective energy scalar and a respective residual vector;
determining overall distortion levels for a plurality of candidate subband pulse allocations for performing pyramid vector quantization (PVQ) of the residual vectors;
selecting, from the plurality of subband pulse allocations and based on the overall distortion levels, a candidate subband pulse allocation; and
performing, using the candidate subband pulse allocation, PVQ on the residual vectors to generate a residual identifier for each residual vector.

25. The method of claim 24, wherein determining the overall distortion levels comprises:
determining an overall distortion level for an initial candidate subband pulse allocation of the plurality of candidate subband pulse allocations;
modifying the allocation of pulses in the initial candidate to generate a next candidate subband pulse allocation of the plurality of candidate subband pulse allocations such that a number of bits used by the next candidate subband pulse allocation is less than a maximum number of bits; and
determining an overall distortion level for the next candidate subband pulse allocation.

26. The method of claim 25, wherein the maximum number of bits is a first maximum number of bits, determining the overall distortion levels and selecting the candidate subband pulse allocation comprises determining the overall distortion levels and selecting the candidate subband pulse allocation for the first frame, the method further comprising:
- determining overall distortion levels for a plurality of candidate subband pulse allocations for performing PVQ of residual vectors for a second frame, wherein the determining comprises:
  - determining an overall distortion level for an initial candidate subband pulse allocation of the plurality of candidate subband pulse allocations for the second frame;
  - modifying the allocation of pulses in the initial candidate to generate a next candidate subband pulse allocation of the plurality of candidate subband pulse allocations such that a number of bits used by the next candidate subband pulse allocation is less than a second maximum number of bits; and
  - determining an overall distortion level for the next candidate subband pulse allocation; and
- selecting, from the plurality of subband pulse allocations for the second frame and based on the overall distortion levels for the second frame, a candidate subband pulse allocation for performing PVQ of residual vectors for the second frame.

27. The method of claim 24, further comprising:
encoding, in an encoded audio bitstream, the residual identifiers.

28. The method of claim 27, further comprising:
encoding, in the encoded audio bitstream, one or more syntax elements that indicate the selected candidate subband pulse allocation.

29. The method of claim 27, further comprising:
transmitting the encoded audio bitstream over a personal area network (PAN) using a PAN communication protocol.

30. The method of claim 29, wherein the PAN communication protocol is a Bluetooth communication protocol.

* * * * *